（12）United States Patent
Brune et al.

(10) Patent No.: US 10,684,354 B2
(45) Date of Patent: Jun. 16, 2020

(54) ANTENNA SUBSYSTEM WITH ANALOG BEAM-STEERING TRANSMIT ARRAY AND DIGITAL BEAM-FORMING RECEIVE ARRAY

(71) Applicant: Echodyne Corp., Kirkland, WA (US)

(72) Inventors: Nicholas K. Brune, Redmond, WA (US); Muhammad Rameez Chatni, Redmond, WA (US); Tom Driscoll, Bellevue, WA (US); Jonathan R. Hull, Woodinville, WA (US); John Desmond Hunt, Seattle, WA (US); Christopher L. Lambrecht, Bothell, WA (US); Nathan Ingle Landy, Seattle, WA (US); Milton Perque, Seattle, WA (US); Charles A. Renneberg, Seattle, WA (US); Benjamin Sikes, Seattle, WA (US); Tarron Teeslink, Kirkland, WA (US); Ioannis Tzanidis, Woodinville, WA (US); Robert Tilman Worl, Issaquah, WA (US); Adam Bily, Seattle, WA (US)

(73) Assignee: Echodyne Corp., Bellevue, WA (US)

( * ) Notice: Subject to any disclaimer, the term of this patent is extended or adjusted under 35 U.S.C. 154(b) by 151 days.

(21) Appl. No.: 15/832,568

(22) Filed: Dec. 5, 2017

(65) Prior Publication Data
US 2018/0156891 A1   Jun. 7, 2018

Related U.S. Application Data

(60) Provisional application No. 62/430,306, filed on Dec. 5, 2016.

(51) Int. Cl.
*G01S 7/28* (2006.01)
*H01Q 1/32* (2006.01)
(Continued)

(52) U.S. Cl.
CPC ........ *G01S 7/2813* (2013.01); *G01S 13/4463* (2013.01); *G01S 13/931* (2013.01);
(Continued)

(58) Field of Classification Search
CPC .. G01S 7/2813; G01S 13/931; G01S 13/4463; H01Q 3/34; H01Q 1/3233;
(Continued)

(56) References Cited

U.S. PATENT DOCUMENTS 2,981,949 A   4/1961 Elliott
3,852,754 A * 12/1974 Worrell .................... G01S 3/48
                                                  342/424
(Continued)

OTHER PUBLICATIONS

Driscoll et al., "Antenna Having Increased Side-Lobe Suppression and Improved Side-Lobe Level", "U.S. Appl. No. 15/240,980 filed Aug. 18, 2016", Aug. 18, 2016, pp. 1-68, Published in: US.
(Continued)

*Primary Examiner* — Frank J McGue
(74) *Attorney, Agent, or Firm* — Fogg & Powers LLC

(57) ABSTRACT

In an embodiment, an antenna subsystem includes a sparse receive antenna and an electronically steerable transmit antenna. The sparse receive antenna includes an array of receive elements each configured to receive a respective signal having a wavelength and each spaced apart from each adjacent one of the receive elements by a respective first distance that is more than one half of the wavelength. And the electronically steerable transmit antenna includes an array of transmit elements each configured to radiate a respective signal having the wavelength and each spaced apart from each adjacent one of the transmit elements by a respective second distance that is less than one half of the wavelength. To reduce aliasing, such an antenna subsystem can be operated to filter, spatially, a receive beam pattern (Continued)

generated by the receive antenna with a transmit beam pattern generated by the transmit antenna.

29 Claims, 17 Drawing Sheets

(51) Int. Cl.
| | | |
|---|---|---|
| *H01Q 3/34* | | (2006.01) |
| *G01S 13/931* | | (2020.01) |
| *G01S 13/44* | | (2006.01) |
| *H01Q 21/06* | | (2006.01) |
| *H01Q 21/00* | | (2006.01) |
| *H01Q 13/20* | | (2006.01) |
| *H01Q 3/26* | | (2006.01) |

(52) U.S. Cl.
CPC ............ *H01Q 1/3233* (2013.01); *H01Q 3/34* (2013.01); *H01Q 21/065* (2013.01); *H01Q 3/26* (2013.01); *H01Q 13/206* (2013.01); *H01Q 21/005* (2013.01); *H01Q 21/0025* (2013.01)

(58) Field of Classification Search
CPC ............ H01Q 21/0025; H01Q 21/005; H01Q 13/206; H01Q 3/26; H01Q 21/065
USPC ........................................... 342/81
See application file for complete search history.

(56) References Cited

U.S. PATENT DOCUMENTS

| | | | | |
|---|---|---|---|---|
| 4,223,315 | A * | 9/1980 | Alford | ............ H01Q 1/36 343/742 |
| 4,870,424 | A | 9/1989 | Lalezari et al. | |
| 5,781,157 | A | 7/1998 | Laird | |
| 7,081,851 | B1 | 7/2006 | Lewis | |
| 9,385,435 | B2 | 7/2016 | Bily et al. | |
| 9,450,310 | B2 | 9/2016 | Bily et al. | |
| 9,853,361 | B2 | 12/2017 | Chen et al. | |
| 2001/0031647 | A1 * | 10/2001 | Scherzer | ............ H04B 7/0619 455/562.1 |
| 2006/0114155 | A1 | 6/2006 | Numminen | |
| 2010/0109965 | A1 * | 5/2010 | Foo | ............ H01Q 1/246 343/836 |
| 2011/0063158 | A1 | 3/2011 | Kondou | |
| 2012/0194399 | A1 * | 8/2012 | Bily | ............ H01Q 13/28 343/772 |
| 2013/0088393 | A1 * | 4/2013 | Lee | ............ G01S 7/354 342/372 |
| 2014/0022109 | A1 * | 1/2014 | Lee | ............ G01S 7/2813 342/70 |
| 2014/0266946 | A1 | 9/2014 | Bily et al. | |
| 2015/0109178 | A1 | 4/2015 | Hyde et al. | |
| 2015/0214615 | A1 | 7/2015 | Patel et al. | |
| 2015/0288063 | A1 * | 10/2015 | Johnson | ............ H01Q 15/0086 342/352 |
| 2015/0318618 | A1 | 11/2015 | Chen et al. | |
| 2016/0011307 | A1 | 1/2016 | Casse et al. | |
| 2016/0099500 | A1 | 4/2016 | Kundtz et al. | |
| 2016/0285172 | A1 * | 9/2016 | Kishigami | ............ H01Q 21/08 |
| 2018/0026365 | A1 | 1/2018 | Driscoll et al. | |
| 2019/0049577 | A1 * | 2/2019 | Iida | ............ G01S 13/42 |

OTHER PUBLICATIONS

Huang et al, "Chapter 11, Design and Modeling of Microstrip Line to Substrate Integrated Waveguide Transitions", "Passive Micowave Components and Antennas", "retrieved on Feb. 5, 2017 from: http://www.intechopen.com/books/passive-microwavecomponents-and-antennas/design-and-modeling-of-microstrip-line-to-substrate-integrated-waveguidetransitions", dated Apr. 1, 2010, pp. 225-246 and reference, Publisher: Intech.

International Searching Authority, "International Search Report and Written Opinion for PCT Application No. PCT/US2017/064754", Foreign Counterpart to U.S. Appl. No. 15/832,568, dated Feb. 22, 2018, pp. 1-16, Published in: WO.

International Searching Authority, "International Search Report from PCT Application No. PCT/US2017/043110 filed Jul. 20, 2017", "from Foreign Counterpart of U.S. Appl. No. 15/655,505", dated Nov. 2, 2017, pp. 1-15, Published in WO.

International Searching Authority, International Search Report and Written Opinion from PCT Application No. PCT/US2017/046943 dated Oct. 26, 2017, From PCT Counterpart of U.S. Appl. No. 15/240,980, pp. 1-20, WO.

* cited by examiner

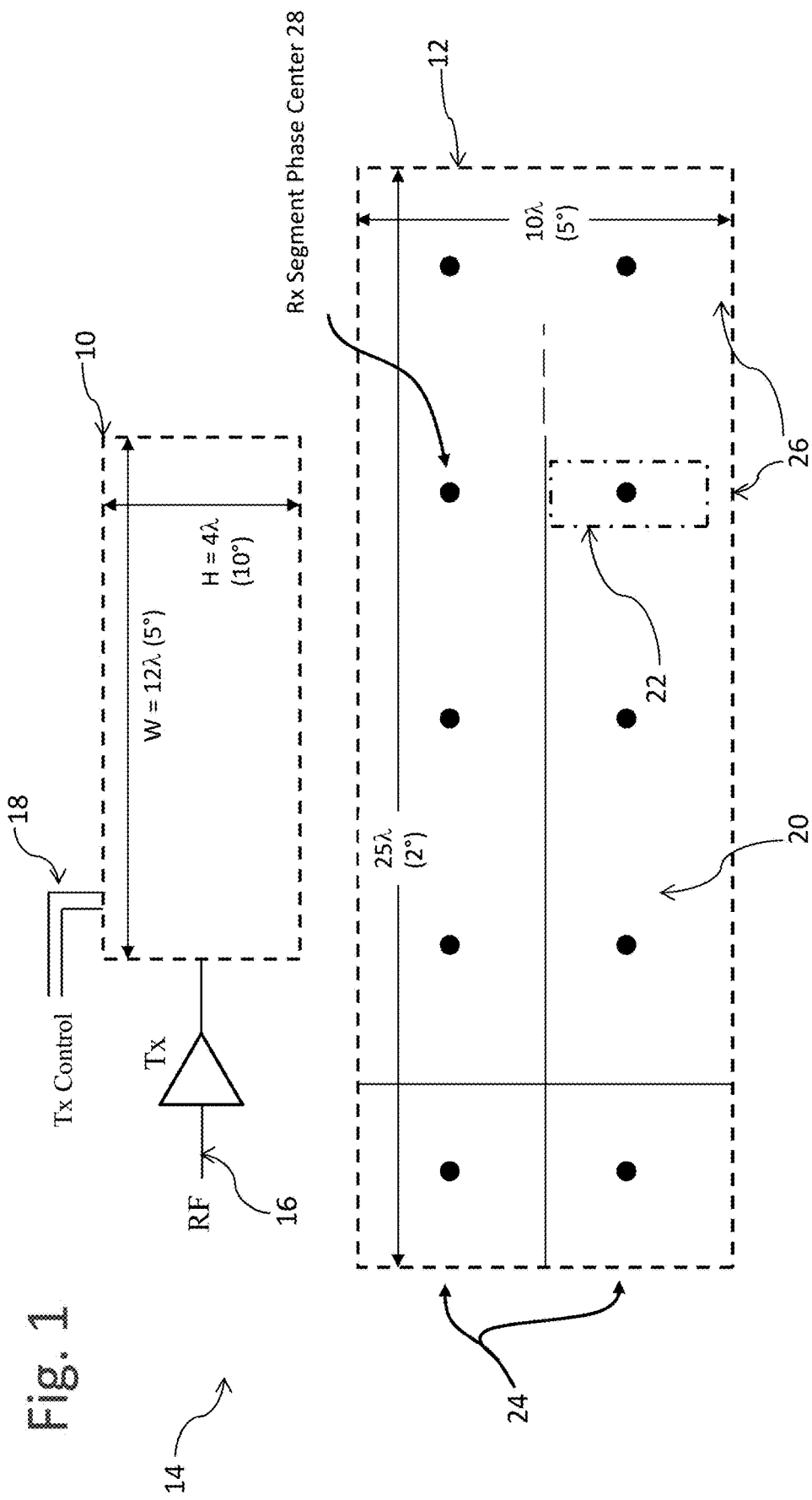

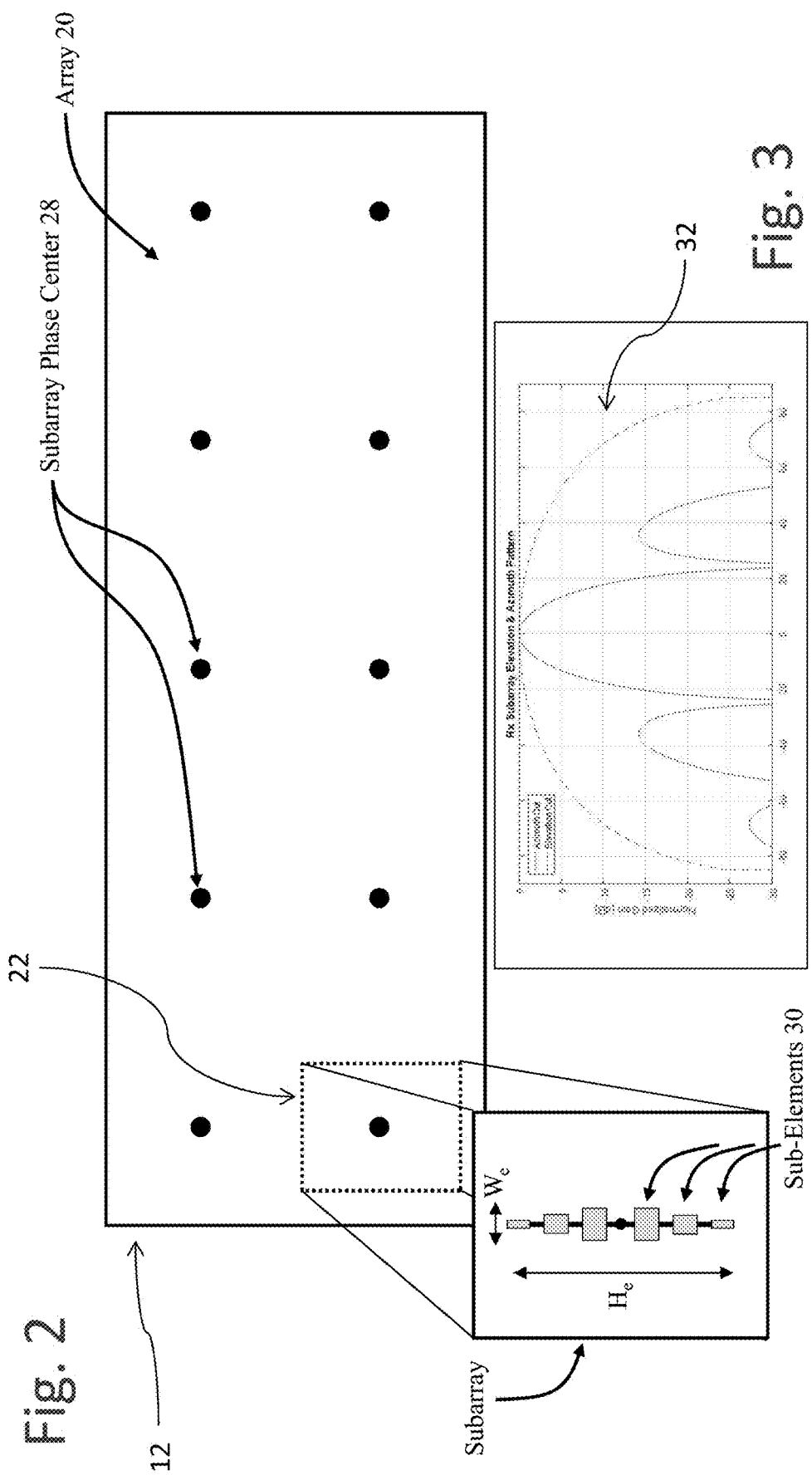

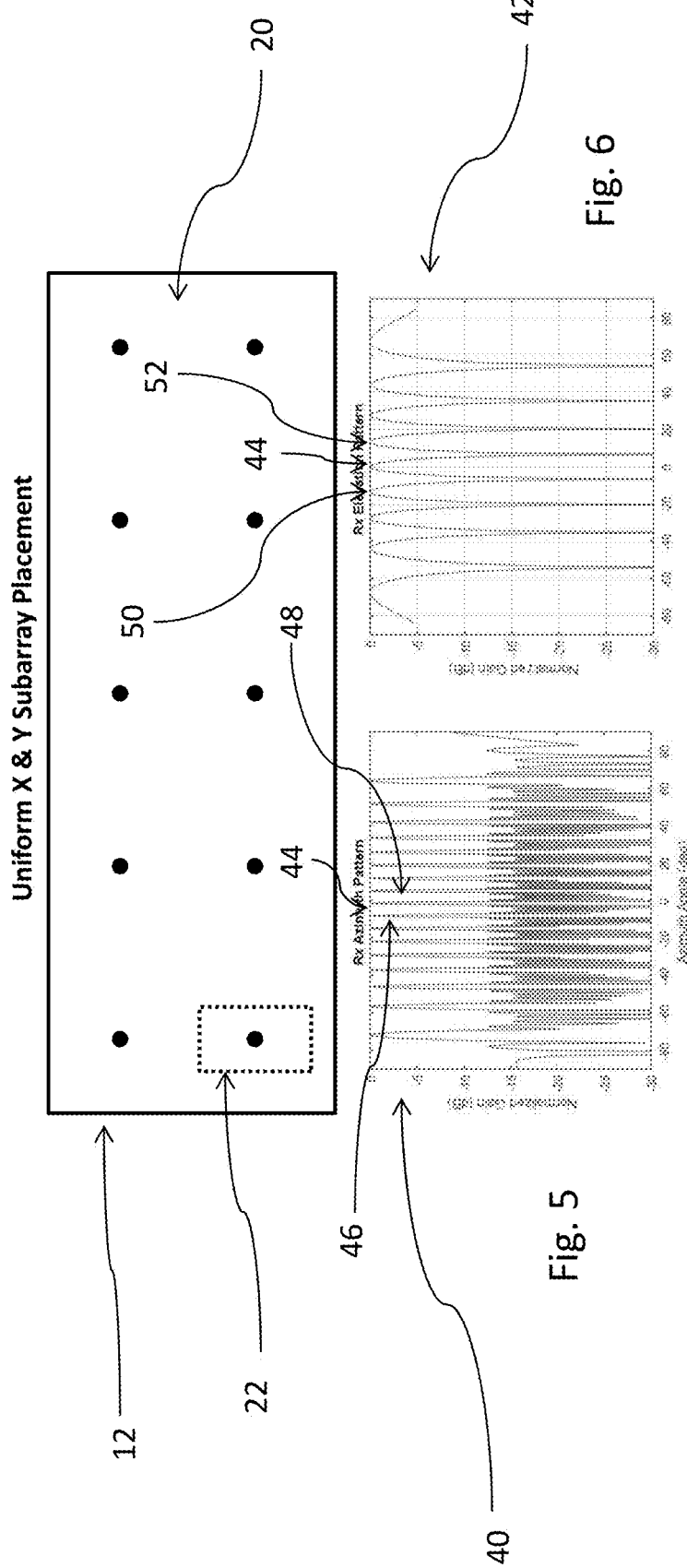

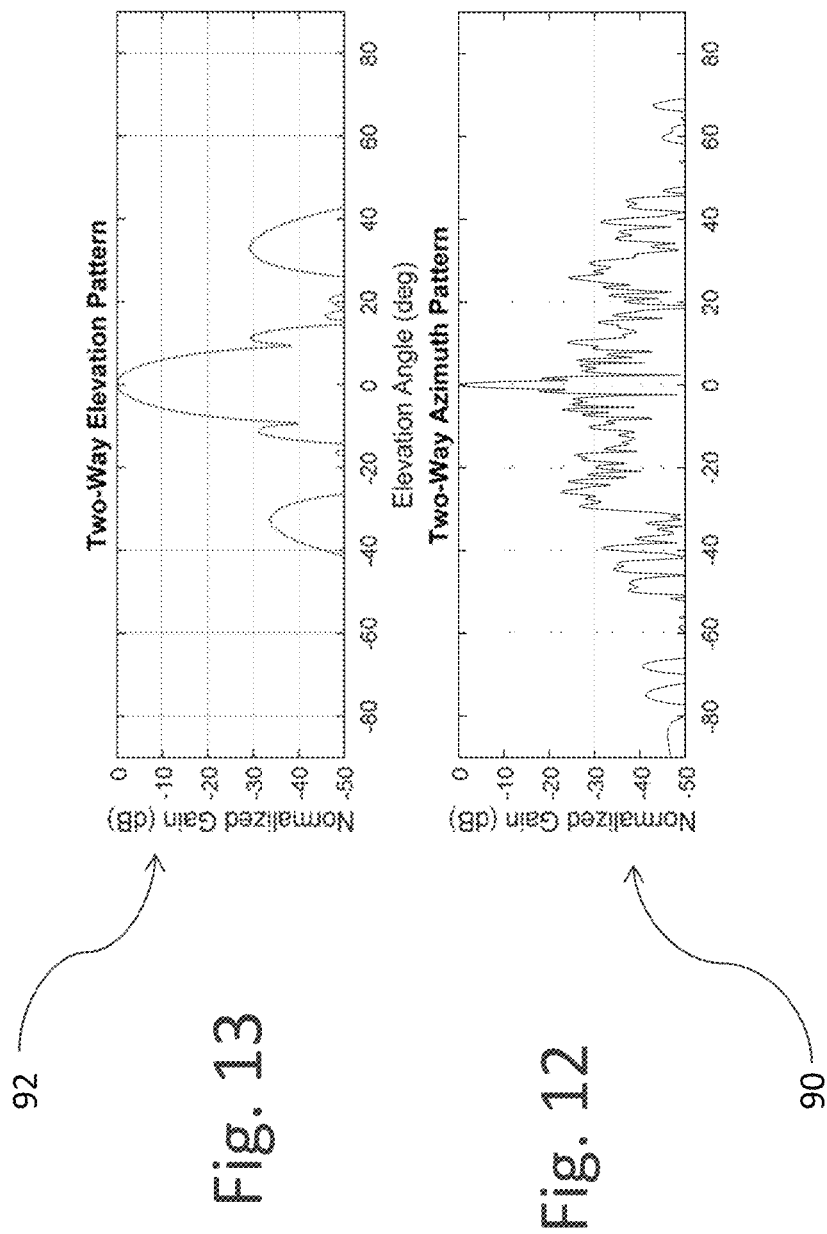

El = 0° Az = 0°

El = 5° Az = 0°

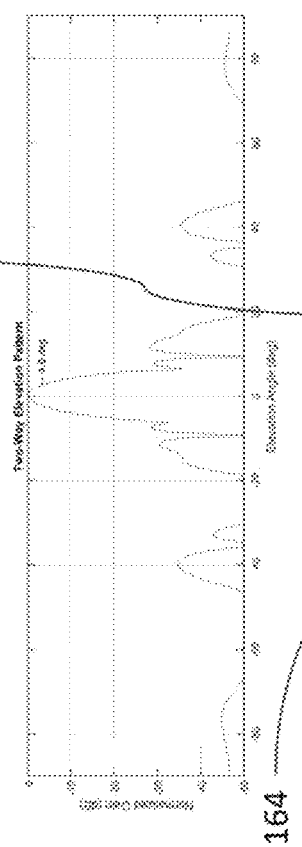
Fig. 24
Fig. 25
El = 0° Az = 49°
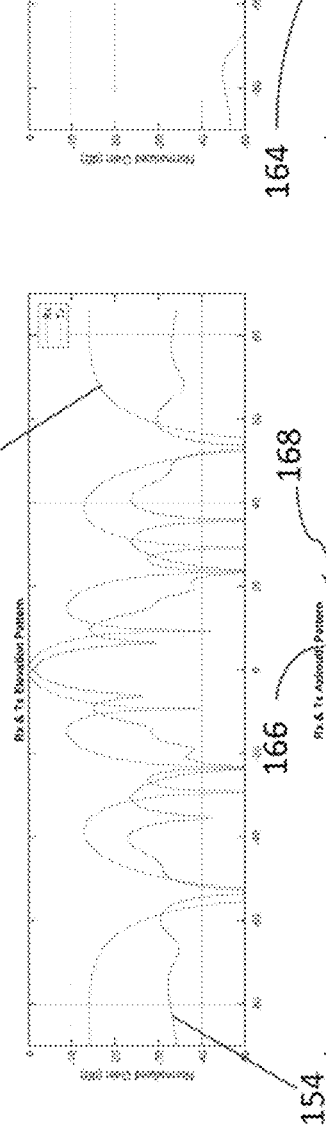
Fig. 26
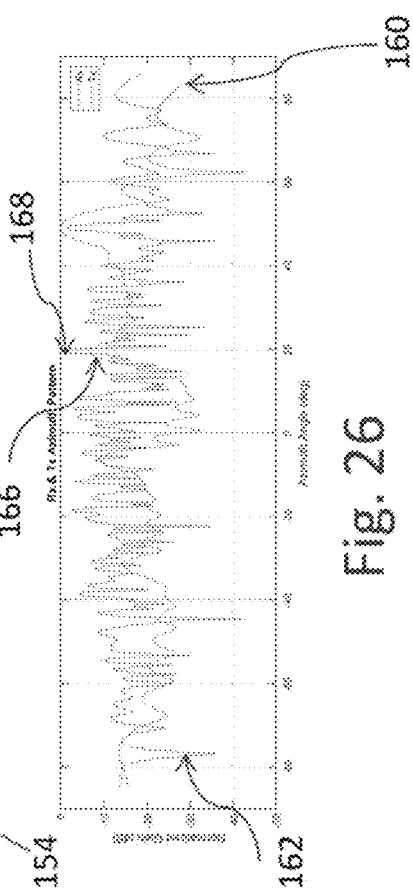
Fig. 27

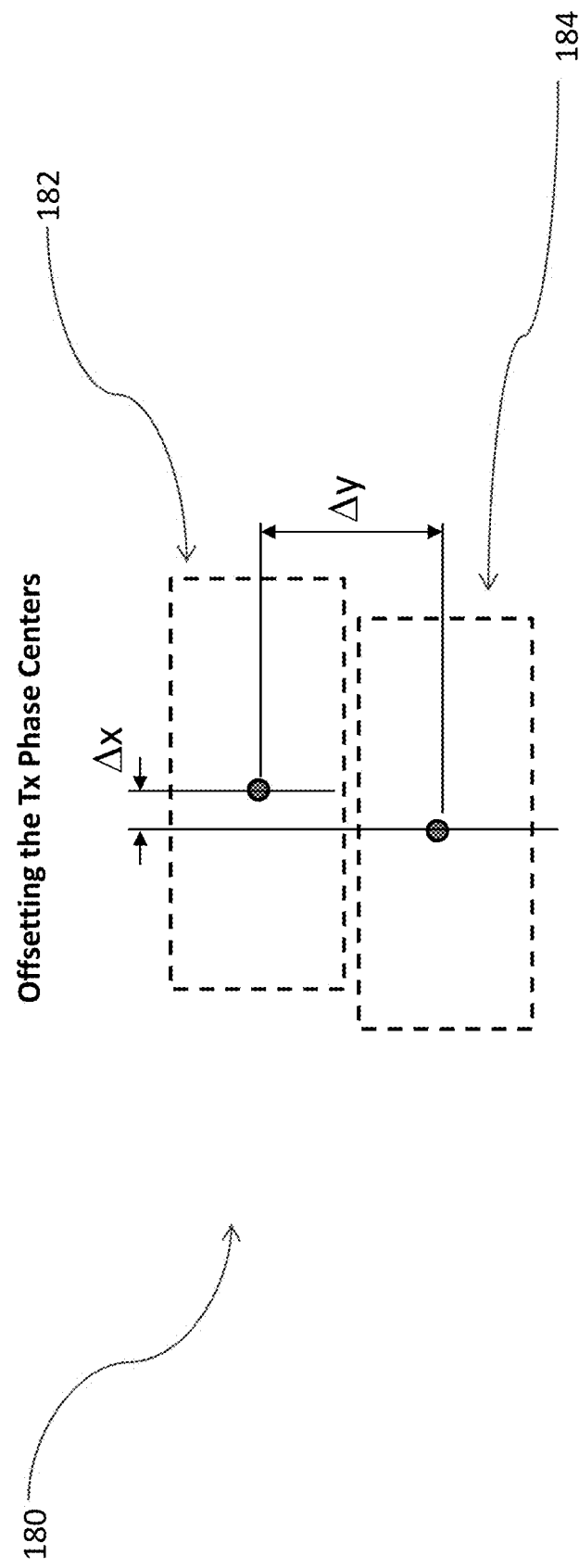

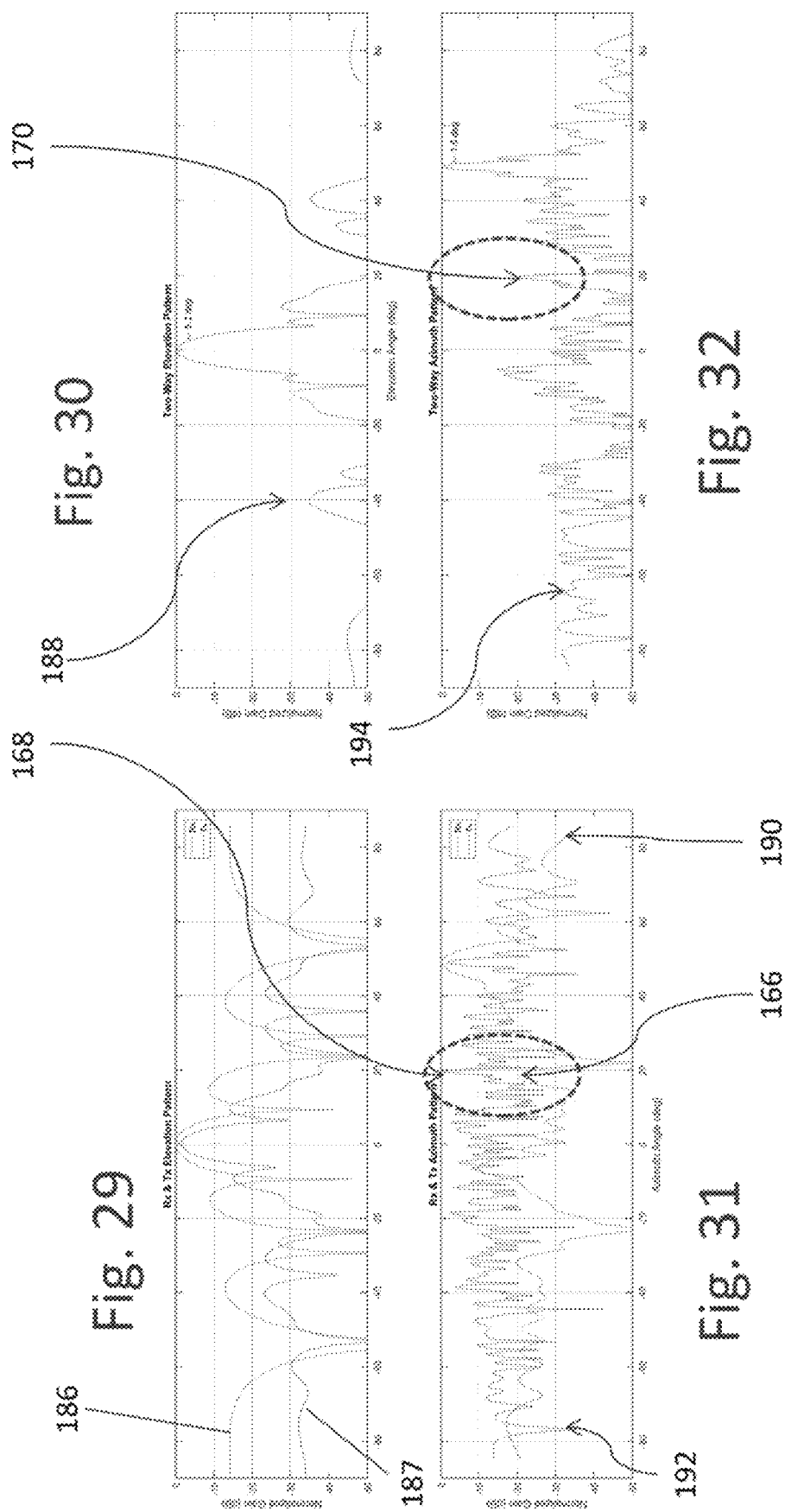

ANTENNA SUBSYSTEM WITH ANALOG BEAM-STEERING TRANSMIT ARRAY AND DIGITAL BEAM-FORMING RECEIVE ARRAY

CROSS-REFERENCE TO RELATED APPLICATION

This application claims benefit of U.S. Provisional Patent Application No. 62/430,306, filed Dec. 5, 2016, and titled "RADAR SYSTEM WITH ANALOG BEAM-STEERING TRANSMIT ARRAY AND DIGITAL BEAM-FORMING RECEIVE ARRAY," the content of which is incorporated herein by reference.

BACKGROUND

A traditional phased-array radar system is unsuitable for some applications due to, e.g., its size, power requirements, the number of array elements per unit area (element density), and cost. For example, the phased array of a traditional radar system is too dense and scans a field of view (FOV) too slowly, and the system is too expensive, for use in an autonomous (self-driving) automobile. Similarly, the phased array of a traditional radar system is too dense, and the system too expensive, too heavy, and too power hungry, for use in an unmanned aerial vehicle (UAV) such as a drone.

Therefore, radar systems that are lighter, are less-dense, are less-expensive, are less power hungry, and can scan a FOV more quickly, than traditional radar systems have been developed for such applications.

An example of such a radar system that has been developed for use in automobiles includes a digital beam-forming (DBF) receive-antenna array having, e.g., at least four to eight individual antenna segments (the number of antenna segments is typically limited to the number of antenna channels that the system circuitry supports, e.g., one antenna segment per antenna channel).

During a transmit period, the system circuitry effectively energizes all of the antenna segments with the same signal, i.e., with respective signals each having the same magnitude and phase, such that the array "sprays" signal energy over a fixed FOV. Put another way, the simultaneous energizing of all the antenna segments with respective signals each having the same magnitude and phase generates a main transmit beam that is stationary, i.e., not steered. In order to cover a useable FOV, this transmit main beam is often fairly wide, e.g. more than 20 degrees in azimuth (AZ).

During a receive period, the system circuitry can post-process, dynamically, a respective gain and phase shift from any receive antenna segment, so as to digitally form and steer a receive beam that is significantly narrower than the transmit beam; the system can steer the receive beam to only a single position, or to multiple positions, within a single receive period.

Unfortunately, a problem with such a radar system is that the receive DBF can be performed only within the region illuminated by the transmit beam. The number of receiver-array segments/channels that are present are utilized to divide the fixed transmit FOV into equal segments; that is, the number of receiver-array segments/channels defines the receive resolution of the DBF, and, ultimately, defines the receive resolution of the entire radar system. The receive resolution defined in this manner is often referred to as the Rayleigh resolution, and represents a fundamental limit of the radar's performance. For example, a radar system that were to illuminate an FOV of 20° in AZ on transmit and that were to include four receive channels would possess a Rayleigh resolution of about 5° across this FOV. An alternate choice could be made to widen the FOV to 40° in AZ, which, with the same four receive channels, would give a Rayleigh resolution of about 10°. Thus, a fundamental trade-off between FOV and Rayleigh resolution exists in such a system.

Designing such a radar to illuminate a large FOV in transmit and also to possess a high Rayleigh resolution in receive would require a large number of antenna segments/channels.

Unfortunately, engineering limits to the number of channels which can be practically included in such a radar has, to date, limited the Rayleigh performance of such radars systems.

One approach to improve the Rayleigh resolution of a system with a fixed number of antenna channels is to place the receive antennas/antenna segments further apart, i.e., to design a sparse receive array.

But such a sparse array can cause spatial aliasing, which produces side-lobes and grating lobes that can hinder the radar system's ability to detect, to identify, and to map objects. One reason for such aliasing-induced side-lobes and grating lobes is that the radar system's sparse receive-antenna array does not meet the Nyquist criteria for maximum segment spacing, which is $\lambda/2$. For example, to obtain a Rayleigh resolution of 1° in the AZ dimension, the antenna would need to have dimensions on the order of 50$\lambda$. Distributing a small number of segments/channels, e.g., four to eight, across a distance of 50$\lambda$ would result in an average segment spacing of 6.25$\lambda$ to 12.5$\lambda$, which is 12 to 25 times the maximum Nyquist spacing of $\lambda/2$. Consequently, the system would suffer from significant side-lobes and grating lobes.

Of course, to reduce spatial aliasing, a designer could reduce the effective size of the antenna by reducing the spacing between the antenna segments.

But reducing the size of the antenna limits the minimum width of the receive beam that the radar system could generate.

Therefore a designer of such a sparse-antenna-array radar system (i.e., a radar system with a larger antenna aperture and a limited number of antenna channels) is faced with trading off beam width for aliasing, and vice-versa. That is, the narrower the receive-beam width, the greater the level of aliasing, and the lower the level of aliasing, the wider the receive-beam width.

SUMMARY

In an embodiment, an antenna subsystem includes a sparse receive antenna and an electronically steerable transmit antenna. The sparse receive antenna includes an array of receive elements each configured to receive a respective signal having a wavelength and each spaced apart from each adjacent one of the receive elements by a respective first distance that is more than one half of the wavelength. And the electronically steerable transmit antenna includes an array of transmit elements each configured to radiate a respective signal having the wavelength and each spaced apart from each adjacent one of the transmit elements by a respective second distance that is less than one half of the wavelength.

For example, such an antenna subsystem effectively spatially filters a receive beam pattern generated by the receive antenna with a transmit beam pattern generated by the transmit antenna to reduce aliasing. For example, the envelope of a main transmit beam can exclude, or at least can attenuate, side lobes of the receive beam pattern. Furthermore, a null of a side lobe of the receive beam pattern can be aligned with a peak of a side lobe of the transmit receive pattern. Moreover, a peak of a side lobe of the receive beam pattern can be aligned with a null of a side lobe of the transmit receive pattern.

In an embodiment, a radar system provides a high Rayleigh resolution (i.e., a narrow Half Power Beam Width (HPBW)) with significantly reduced aliasing as compared to prior radar systems. The radar system includes an analog transmit array with the ability to electronically adjust the transmit beam pattern and to act as a spatial filter for the receive antenna pattern, and includes a Nyquist complete or a sparse digital beam-forming (DBF) array antenna for generating a receive beam that subtends the transmit antenna's main illumination beam. By appropriately designing and driving the transmitting and receiving antennas, the radar system effectively can generate and steer a beam of narrow width (e.g., ≤2° in both the AZ and elevation (EL) dimensions). Moreover, the radar system can do this without requiring the large number of antenna channels (e.g., 64 to 128) typically required for such performance. For example, an embodiment of a radar system with only twelve antenna channels for the receive sparse DBF array antenna effectively can generate and steer a beam of a width of approximately 2° in AZ and 5° EL; therefore, such a radar system has significantly better angular performance than prior radar systems with a similar number of antenna channels.

BRIEF DESCRIPTION OF THE DRAWINGS

FIG. 1 is a diagram of a Metamaterial Electronic Steering Array (MESA) transmit-antenna section and of a sparse DBF receive-antenna section of a radar system, according to an embodiment.

FIG. 2 is a diagram of the sparse DBF receive-antenna section of FIG. 1 with a magnified view of one of the subarrays, according to an embodiment.

FIG. 3 is a plot of the receive-beam pattern of an antenna element of the receive-antenna section of FIG. 2 in the AZ and EL dimensions, according to an embodiment.

FIG. 4 is a diagram of the sparse DBF receive-antenna section of FIG. 2, according to an embodiment.

FIG. 5 is a plot of the receive-beam pattern in AZ of the sparse DBF receive-antenna section of FIG. 4, according to an embodiment.

FIG. 6 is a plot of the receive-beam pattern in EL of the sparse DBF receive-antenna section of FIG. 4, according to an embodiment.

FIG. 12 is a plot of the effective (i.e., two-way) beam pattern in the AZ dimension resulting from the combination of the patterns (FIGS. 10-11) of the receive antenna sub-elements (FIG. 2), receive-antenna array (FIG. 9), and the transmit-antenna section (FIG. 1), according to an embodiment.

FIG. 13 is a plot of the effective (two-way) beam pattern in the EL dimension resulting from the combination of the patterns (FIGS. 10-11) of the receive antenna sub-elements (FIG. 2), receive-antenna array (FIG. 9), and the transmit-antenna section (FIG. 1), according to an embodiment.

FIG. 24 is a plot of a transmit beam-and-side-lobe pattern in the EL dimension of an embodiment the transmit-antenna section of FIG. 14, overlaying a receive beam-and-side-lobe pattern in the EL dimension of an embodiment of the receive-antenna section of FIG. 9, according to an embodiment in which EL=0° and AZ=49°.

FIG. 25 is a plot of the effective (two-way) beam pattern in the EL dimension resulting from the combination of the transmit and receive beam patterns of FIG. 24, according to an embodiment in which EL=0° and AZ=49°.

FIG. 26 is a plot of a transmit beam-and-side-lobe pattern in the AZ dimension of an embodiment of the transmit-antenna section of FIG. 14, overlaying a receive beam-and-side-lobe pattern in the AZ dimension of an embodiment of the receive-antenna section of FIG. 9, according to an embodiment in which EL=0° and AZ=49°.

FIG. 27 is a plot of an effective (two-way) beam pattern in the AZ dimension resulting from the combination of the transmit and receive beam patterns of FIG. 26, according to an embodiment in which EL=0° and AZ=49°.

FIG. 28 is a diagram of a transmit-antenna section having multiple (here two) subsections, according to another embodiment.

FIG. 29 is a plot of a transmit beam-and-side-lobe pattern in the EL dimension of an embodiment the transmit-antenna section of FIG. 28, overlaying a receive beam-and-side-lobe pattern in the EL dimension of an embodiment of the receive-antenna section of FIG. 9, according to an embodiment in which EL=0° and AZ=49°.

FIG. 30 is a plot of the effective (two-way) beam pattern in the EL dimension resulting from the combination of the transmit and receive beam patterns of FIG. 29, according to an embodiment in which EL=0° and AZ=49°.

FIG. 31 is a plot of a transmit beam-and-side-lobe pattern in the AZ dimension of an embodiment of the transmit-antenna section of FIG. 14, overlaying a receive beam-and-side-lobe pattern in the AZ dimension of an embodiment of the receive-antenna section of FIG. 9, according to an embodiment in which EL=0° and AZ=49°.

FIG. 32 is a plot of an effective (two-way) beam pattern in the AZ dimension resulting from the combination of the transmit and receive beam patterns of FIG. 31, according to an embodiment in which EL=0° and AZ=49°.

DETAILED DESCRIPTION

Figure 8:
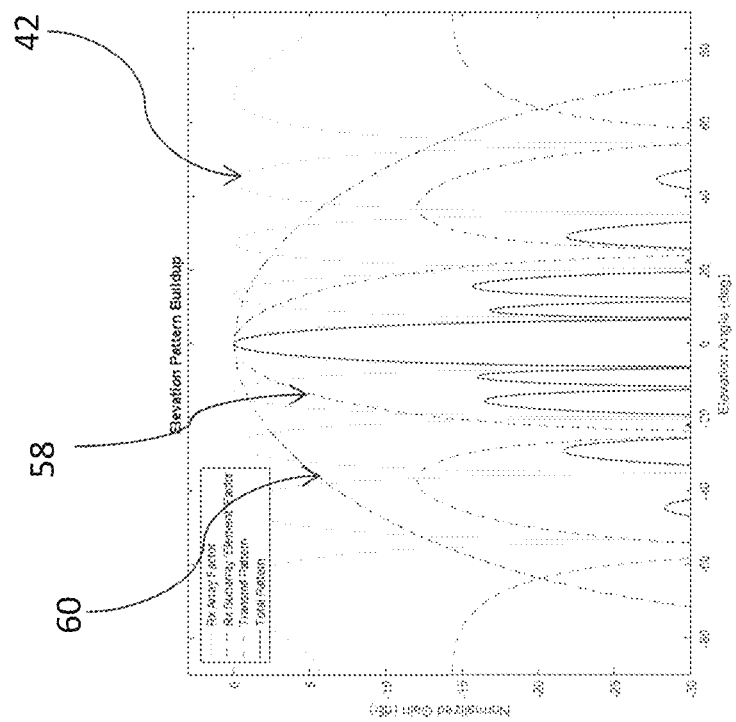
FIG. 8 is a diagram of the transmit beam pattern of the transmitter-antenna section of FIG. 1, and the receive element beam pattern and the receive array beam pattern in EL for the sparse DBF receive-antenna section of FIG. 4, according to an embodiment.

The words "approximately" and "substantially" may be used below to indicate that two or more quantities can be exactly equal, or can be within ±10% of each other due to manufacturing tolerances, or other design considerations, of the physical structures described below.

FIG. 1 is a diagram of a Metamaterial Electronic Steering Array (MESA) transmit-antenna section 10 and a sparse DBF receive-antenna section 12 of a radar system 14, according to an embodiment; the radar system, which is further described below in conjunction with FIGS. 33-34, can include other components not shown in FIG. 1, such as amplifiers, phase shifters, and other drive circuitry. Furthermore, the transmit-antenna section 10 can form an entire transmit antenna of the radar system 14, or only a section of the transmit antenna, which may include one or more other sections similar to the section 10; similarly, the receive-antenna section 12 can form an entire receive antenna of the radar system, or only a section of the receive antenna, which may include one or more other sections similar to the section 12. Moreover, the radar system 14 can be configured to operate in any conventional radar frequency band; for example, the radar system can be configured to operate in the W band, which ranges from 75 GHz-110 GHz, and can be tuned for operation between 76 GHz-81 GHz. In addition, an example of the structure and operation of a MESA transmit-antenna section that a designer can use as the transmit-antenna section 10 is described below in conjunctions with FIGS. 35-37.

The transmit-antenna section 10 includes one or more electronically steerable/switchable arrays (ESA), for instance, but not necessarily, a MESA. Furthermore, the transmit-antenna section 10 can have any suitable dimensions, such as of approximately W=10λ×H=3λ, or W=12λ×H=4λ. These dimensions, which define an aperture of the transmit-antenna section 10, also affect the minimum Half-Power Beam Width (HPBW) of the transmit beam in the AZ and EL dimensions because it is known that the HPBW is inversely proportional to aperture size. For example, for W=12λ×H=4λ, an embodiment of the transmit-antenna section 10 can generate a transmit beam having a minimum HPBW of 5° in the AZ dimension and 10° in the EL dimension.

Each ESA of the transmit-antenna section 10 (only one ESA shown in FIG. 1) includes a respective one analog RF channel input 16, where the RF signal is distributed throughout the ESA area and/or to the sub-elements of the ESA by conventional methods, e.g., a waveguide, a transmission line, or microstrips.

Each ESA of the transmit-antenna section 10 also includes one or more control lines 18, either digital or analog, which provide for the electronic control of the transmit-array beam steering. This control can be implemented as a single digital line 18, as a collection of digital lines (e.g., a digital bus), or as a collection of analog lines.

Furthermore, the one or more control lines 18 are each configured to carry a respective control signal that, depending on the collective state of the control signal(s) over time (e.g., logic high or logic low, or array of analog voltages), electronically activates a particular configuration of the transmit-array section 10, the configuration describing a particular transmit-beam position, transmit-beam side-lobe level, transmit-beam HPBW, etc.

Moreover, multiple ESAs can be configured to work together, each with its own analog-transmit input, by coordinating and synchronizing the transmit-array configurations sent via the respective control lines 18.

Still referring to FIG. 1, the receive-antenna section 12 includes an array 20 of antenna elements 22, which antenna elements can also be called "antenna segments," or "segments." The array 20 is segmented into rows 24 and columns 26 of antenna elements 22. For example, the array 20 can have six columns 26 and two rows 24 for a total of twelve antenna elements 22. Alternatively, for example, as shown in FIG. 1, the array 20 can have five columns 26 and two rows 24 for a total of ten antenna elements 22.

Furthermore, the respective phase center 28 of each antenna segment 22 is coupled to a single RF receive channel (not shown in FIG. 1), such that the receive-antenna section 12 is a digital beam-forming (DBF) array. Each receive channel can include a respective amplifier (not shown in FIG. 1), a respective down-converter (not shown in FIG. 1), a respective Analog-to-Digital Converter (ADC) (not shown in FIG. 1), and other RF, analog, and digital components that allow the radar system 14 to measure and digitize the respective signal received by each corresponding antenna element 22. Furthermore, the receive-antenna section 12 can have any suitable dimensions, such as, for example, of approximately W=25λ×H=10λ. These dimensions, which define an aperture of the receive-antenna section 12, also affect the minimum Half-Power Beam Width (HPBW) of the receive beam in the AZ and EL dimensions because it is known that the HPBW is inversely proportional to aperture size. For example, for W=25λ×H=10λ, an embodiment of the receive-antenna section 12 can generate a receive beam having a minimum HPBW of 5° in the AZ dimension and 10° in the EL dimension.

Moreover, the antenna elements 22 within the receive-antenna array 20 can be of any shape and material that provides advantageous antenna-element characteristics, such as, for example, efficiency, gain, bandwidth, HPBW in the AZ and EL dimensions, etc.

In addition, each of the antenna elements 22 can include one or more sub-elements. For example, in configurations such as microstrip-fed patch array, CPW patch array, etc., an antenna element 22 can include multiple sub-elements.

Still referring to FIG. 1, operation of the radar system 14 is described according to an embodiment.

In general, because the ESA transmit-antenna section 10 generates a transmit beam with side lobes of relatively low power, and the radar system 14 aligns the receive beam (or receive beams, see below) within the transmit beam, the redirected transmit energy received by the receive-beam-pattern side lobes is significantly reduced as compared to prior radar systems. Therefore, even if the receive-beam-pattern side lobes are relatively large, and, therefore, can result in significant spatial aliasing, adding the controlled ESA transmit beam pattern (as opposed to the transmit "blast" or "spray" of prior radar systems) with relatively low-magnitude transmit-beam-pattern side lobes significantly reduces aliasing because a larger percentage of the redirected transmitted energy is received by the receive beam(s), and a lower percentage of the redirected transmitted energy is received by the receive side lobes, as compared to prior radar systems. Put another way, by including the ESA transmit-antenna section 10, the radar system 14 can generate, with a "sparse" receive DBF array 20 (i.e., an array with antenna segments 22 spaced apart by a distance>>λ/2), an effective receive beam (i.e., the beam resulting from the combination of the transmit and receive beams) having a HPBW that is much narrower than would otherwise be possible with the DBF array alone or paired with the "blast" or "spray" transmission of prior radar systems.

In more detail, the radar system 14 steers a transmit beam in a chosen AZ direction and chosen EL direction using the one or more ESA control lines 18. These chosen directions, constrained by the HPBW of the ESA transmit beam, collectively define a region of illumination within which the receive DBF array 20 can operate with significantly reduced spatial aliasing.

This area of illumination can be resolved with relatively high Rayleigh resolution by the DFB array 20, and the transmit-antenna section 10 can then illuminate a new area through reconfiguration of the transmit-antenna section 10 and its transmit-beam pattern using the one or more control lines 18. A very wide FOV can be covered through the sequential reconfiguration of the transmit-antenna section 10 and its transmit beam pattern from a current illumination area to a new illumination area followed by resolution using the DBF array 20. The sequence of this illumination can be ordered (e.g., raster scan, conical scan), disordered (random, Hadamard), or dynamically or intelligently sequenced (taskable illumination, prioritized FOV time-weighting, etc.).

Still referring to FIG. 1, the radar system 14 steers the receive-array beam(s) as follows.

In an embodiment, the radar system 14 operates in a continuous-wave (CW) mode in which it generates the transmit beam and the receive beam simultaneously. But the radar system 14 also can be configured to operate in a pulsed mode in which it generates one or more "pulses" of the transmit beam, deactivates the transmit beam, activates the receive beam, deactivates the receive beam, and repeats this procedure. Even though the below description presumes that the radar system 14 is operating in a CW mode, the below description is also applicable to the radar system operating in a pulsed mode.

The radar system 14 simultaneously steers one or more receive beams by selectively applying, to the respective signal received by each antenna segment 22, a respective complex-element weighting, which effectively applies to the respective signal a respective phase shift and a respective gain (the gain can be less than, equal to, or greater than one). That is, the radar system 14 operates the receive-antenna array 20 as a true phased array.

In an embodiment in which the radar system 14 generates only a single receive beam, even with only twelve antenna segments 22, the radar system can generate the receive beam having a relatively narrow width (e.g., 2° HPBW in the AZ dimension), and can steer the beam in the AZ dimension in very fine steps (e.g., 0.1° steps). Because, as described above, the transmit beam super-tends the receive beam, the radar system 14 can steer the receive beam within the Transmit Illumination Solid Angle (TISA), e.g., the region bounded by the HPBW of the transmit beam. The steps may or may not be such that a receive beam in one position overlaps an adjacent previous position of the receive beam.

In another embodiment, the radar system 14 simultaneously generates a "bundle" of receive beams that "fit" into the TISA region. For example, if the TISA region is likened to a box of spaghetti, then each strand of spaghetti in the bundle represents a respective receive beam. In this embodiment, because the bundle of receive beams "fills" the TISA, the radar system 14 need not steer the receive beams as described in the above embodiment. That is, in this embodiment, the radar system 14 simultaneously covers, with multiple receive beams, the TISA region, whereas in the above-described embodiment, the radar system sequentially steers a single receive beam from receive-beam position to receive-beam position to cover the TISA region over a period of time.

In yet another embodiment, the radar system 14 simultaneously generates a bundle of receive beams that 'fit' within the TISA region but do not it. Then, the radar system sequentially steers the bundle of receive beams from bundle position to bundle position to cover the TISA region over a period of time. A bundle position may or may not overlap another bundle position.

In still another embodiment, the bundle of receive beams includes fewer beams than needed to "fill" the TISA region. Therefore, the radar system 14 can steer the bundle, or one or more receive beams within the bundle, so that at least one receive beam occupies each region within the TISA region before the radar system reconfigures the transmit ESA(s) to steer the transmit beam to another position.

Hereinafter, the radar system 14 is described as generating and steering a single receive beam, it being understood that the description also applies to the radar system simultaneously generating and steering a plurality (e.g., a bundle) of receive beams unless otherwise noted.

FIG. 2 is a diagram of the receive-antenna section 12, the array 20 of antenna elements 22, the phase centers 28 of the antenna elements, and a magnified view of one of the antenna elements 22, according to an embodiment. In this embodiment, which is not intended to be limiting, each antenna element 22 includes a micro-strip-fed series subarray of patch sub-elements 30.

FIG. 3 is a plot that depicts the design of the elemental beam pattern 32 (the pattern of the receive beam) in the AZ and EL dimensions. The elemental beam pattern 32, and its characteristic HPBW in AZ and EL, define the FOV over which each receive channel, and, therefore, ultimately over which the receive array 20, is able to receive signals. In turn, the element beam pattern 32 also defines the FOV over which the entire radar system can operate.

Referring to FIGS. 2-3, in one embodiment, the receive elements 22 are designed with a number and geometry of sub-elements 30 that impart to the receive array 20 a total HPBW of about 90° degrees in the AZ dimension and of about 20° degrees in the EL dimension, allowing for a radar system 14 with a very wide FOV in the AZ dimension and a somewhat constricted FOV in the EL dimension.

FIG. 4 is a diagram of the area of the receive-antenna section 12, and the receive array 20.

FIGS. 5-6 are plots of the receive-beam patterns 40 and 42 in the AZ dimension and in the EL dimension, respectively, which patterns result from the geometric arrangement of the array 20; the geometric arrangement of the array 20 is typically referred to as the "array-factor."

Referring to FIGS. 4-6, the array-factor beam pattern (the AZ and EL receive-beam patterns viewed together) is affected by the choice of complex weights (amplitude and phase) that are applied to the receive channels, and there are a very large number of possible receive-beam patterns that generate individual beams or bundles of beams as discussed above. Said differently, the AZ and EL receive-beam patterns 40 and 42 in FIGS. 5-6 result only from the geometry of the array 20 (i.e., the relative positions of the antenna elements 22), and the choice of the complex receive weights.

The array-factor receive-beam pattern possesses beam characteristics such as HPBW, beam-angle, and side-lobe-level, which are affected by the choice of the complex receive weights. The AZ pattern 40 includes a receive beam 44 and major side lobes 46 and 48. The major side lobes 46 and 48 each have a maximum power level greater than one half the power level of (i.e., less than 3 dB down from) the power level of the receive beam 44. Similarly, the EL pattern 42 includes the receive beam 44 and major side lobes 50 and 52.

A goal of a radar-system designer of the radar system 14 (FIGS. 1 and 33) is to maximally exclude the side-lobes 46, 48, 50, and 52 from the HPBW regions of the transmit beam in both AZ and EL dimensions by aligning the transmit and receive patterns to maximally exclude side-lobes outside the region of interest.

Figure 7:
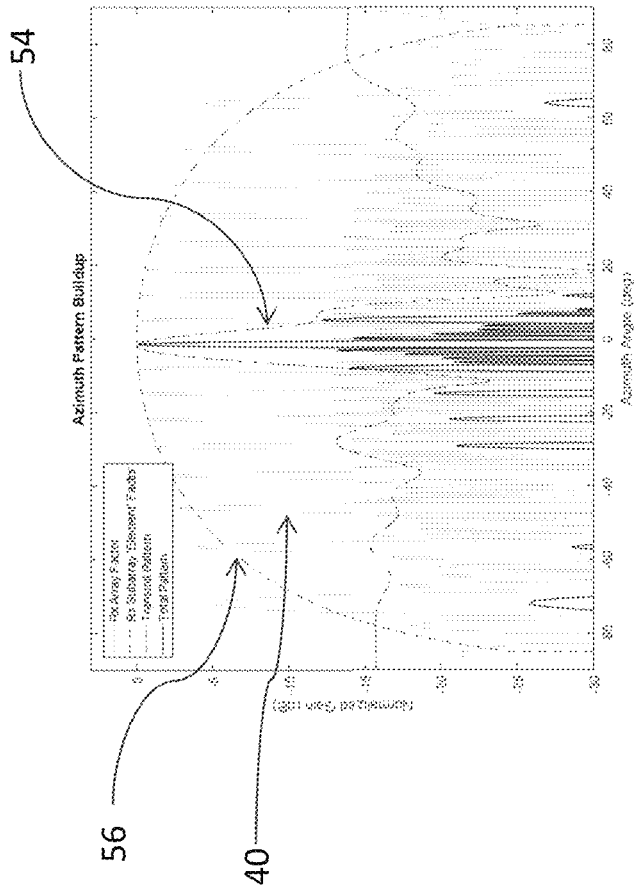
FIG. 7 is a diagram of the transmit beam pattern of the transmitter-antenna section of FIG. 1, and the receive element beam pattern and the receive array beam pattern in AZ for the sparse DBF receive-antenna section of FIG. 4, according to an embodiment.

FIG. 7 is a diagram that depicts the transmit beam pattern 54, the receive-element beam pattern 56, and the beam pattern in the AZ dimension for the receive array 40 for an embodiment. The receive-element beam pattern 56 is due to the arrangement, size, shape, etc. of the antenna sub-elements 30 (FIG. 2). As can be seen, a majority of the receive spatial aliasing lies outside the HPBW of the transmit beam pattern 54; therefore, the combination of the transmit-antenna section and the sparse receive-antenna section highly suppresses the receive spatial aliasing in AZ.

FIG. 8 is a diagram that depicts the transmit beam pattern 58, receive-element beam pattern 60, and the beam pattern of the receive array 42, in the EL dimension, for an embodiment. As can be seen, a majority of the receive spatial aliasing lies outside the HPBW of the transmit beam pattern 58; therefore, the combination of the transmit-antenna section and the sparse receive-antenna section highly suppresses the receive spatial aliasing in EL.

To the extent that there are practical limits on the shape of the transmit beam, e.g., the sharpness with which the transmit beam progresses from its central region through its HPBW and to lower levels, to the extent that there are practical limits on the shape, location, and level, of the side-lobes of the transmit beam, and considering that these limitations exist in both AZ and EL, a designer of the radar system 14 may face challenges at reducing the side-lobes of the radar system to a desired level for a particular application.

Consequently, to further reduce spatial aliasing side-lobes that may exist in AZ and EL, and as described below in conjunction with FIG. 9, the radar-system designer can also leverage the plurality of allowable receive-array 20 geometric configurations.

In considering the above, it is noted that the sparsification of the receive array—that is, the separation of array elements by much greater than $\lambda/2$—in addition to offering the benefit of reduced required channel count over a given receive area, also offers additional degrees of freedom in the placement of the receive elements 22. Said differently, a fixed number of receive elements 22 placed over a large area have a number of possible positional configurations in which they do not collide or overlap, the number of such possible positional configurations growing with the area of the receive-antenna array 20.

Figure 9:
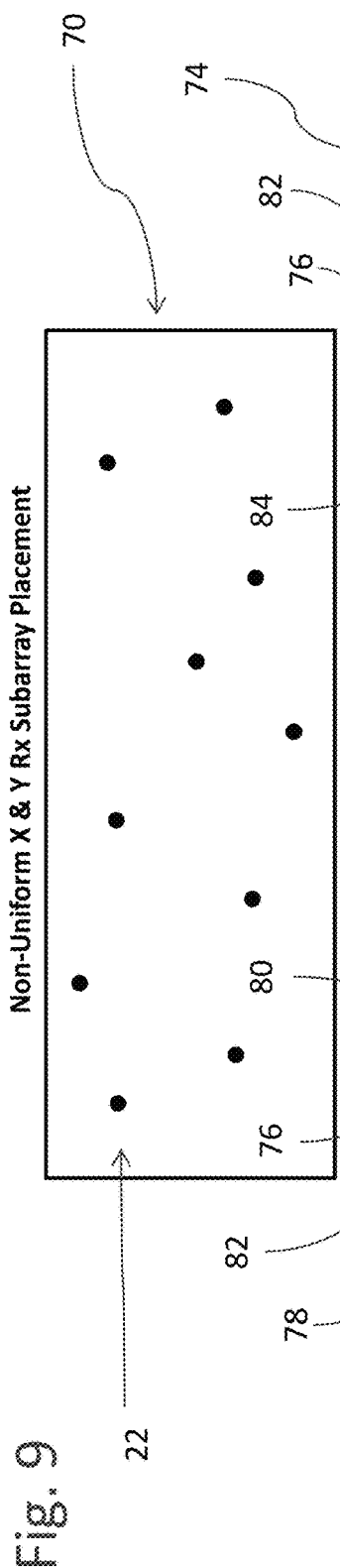
FIG. 9 is a diagram of a receive-antenna array section that can be used in a radar system, according to another embodiment.

FIG. 9 is a diagram of a receive-antenna array section 70, which the can be used in the radar system 14 instead of the receive-antenna array section 20 of FIGS. 1, 2, and 4.

Figure 11:
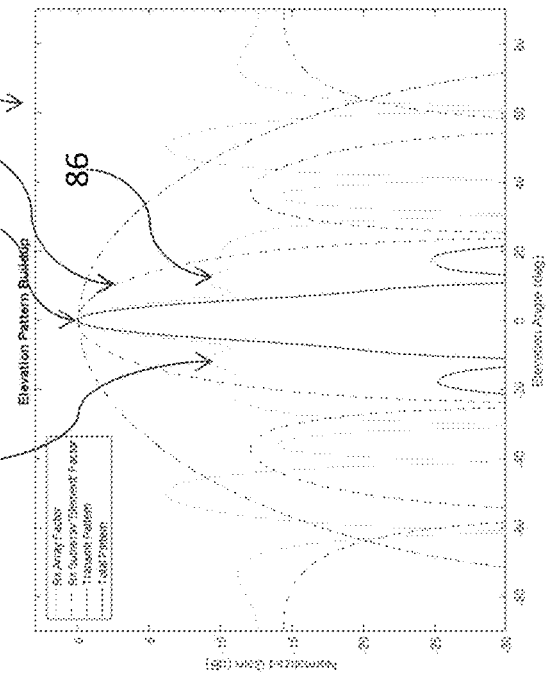
FIG. 11 is a plot of the beam-and-side-lobe patterns of the receive-antenna array section of FIG. 9 in the EL dimension for a single main receive beam, according to an embodiment.
Figure 10:
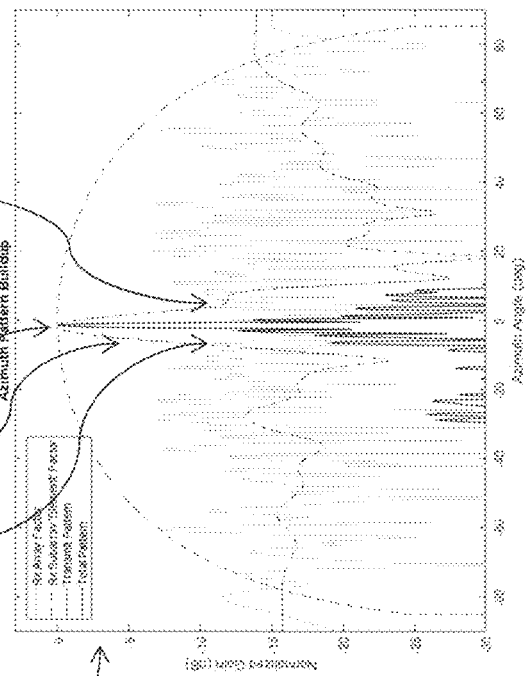
FIG. 10 is a plot of the beam-and-side-lobe patterns of the receive-antenna array section of FIG. 9 in the AZ dimension for a single main receive beam, according to an embodiment.

FIGS. 10-11 are plots of the beam-and-side-lobe patterns 72 and 74 in the AZ and EL dimensions, respectively, as generated by the antenna section 70 for a single receive beam (if the radar system 14 generates a bundle of receive beams, then these plots are for each receive beam in the bundle).

Referring to FIGS. 9-11, as described below, the receive-antenna section 70 can generate major receive side lobes that are of lower power than the major receive side lobes 46, 48, 50, and 52 (FIGS. 5-6) generated by the receive antenna 12 (FIGS. 1-2), and, therefore, can further decrease aliasing caused by the receive side lobes.

Like the receive-antenna section 12 of FIGS. 1-2 and 4, the receive-antenna section 70 includes ten antenna segments 22 each having six antenna sub-elements 30 (not shown in FIGS. 9-11).

But unlike the receive-antenna section 12 of FIGS. 1-2 and 4, the antenna segments 22 are not arranged in the Cartesian vertical columns 26 and horizontal rows 24 of FIG. 1, but are instead arranged in the pattern shown in FIG.

9. As described below, this receive-antenna pattern significantly reduces the levels of the major receive side lobes in both the AZ and EL dimensions, and, therefore, further reduces aliasing, as compared to the receive-antenna section 12 of FIG. 1.

Still referring to FIGS. 9-11, the AZ beam pattern 72 of the receive-antenna section 70 includes a receive beam 76 and receive side lobes 78 and 80. The side lobes 78 closest to the receive beam 76 each have a maximum power level that is at least 11 dB down from the power level of the receive beam 76. Therefore, even though the side lobes 78 are close to, and may even be within, the HPBW region of the transmit beam 82 in the AZ dimension, the side lobes 78 provide a significant reduction in aliasing compared to the level of aliasing generated by the receive-antenna section 12 of FIG. 1 because the power level of each of the side lobes 78 is at least 10 dB down from the power levels of the closest side lobe 46 generated by the receive-antenna section 12. And even though the side lobes 80 are close to, and may even be within, the HPBW region of the transmit beam 82 in the AZ dimension, the side lobes 80 provide a significant reduction in aliasing compared to the level of aliasing generated by the receive-antenna section 12 of FIG. 1 because the power level of each of the side lobes 80 is at least 10 dB down from the power levels of the closest side lobe 48 (FIG. 5) generated by the receive-antenna section 12.

Similarly, the EL pattern 74 includes the receive beam 76 and side lobes 84 and 86. The side lobes 84 closest to the receive beam 76 each have a maximum power level that is at least 10 dB down from the power level of the beam 76. Therefore, even though the side lobes 84 are close to, and may even be within, the HPBW region of the transmit beam 82 in the EL dimension, the side lobes 84 provide a significant reduction in aliasing compared to the level of aliasing generated by the receive-antenna section 12 of FIG. 1 because the power level of each of the side lobes 84 is at least 10 dB down from the power levels of the closest side lobes 50 (FIG. 6) generated by the receive-antenna section 12. And the receive side lobes 86 closest to the receive beam 76 each have a maximum power level that is at least 10 dB down from the power level of the beam 76. Therefore, even though the side lobes 86 are close to, and may even be within, the HPBW region of the transmit beam 82 in the EL dimension, the side lobes 86 provide a significant reduction in aliasing compared to the level of aliasing generated by the receive-antenna section 12 of FIG. 1 because the power level of each of the side lobes 86 is at least 10 dB down from the power levels of the closest side lobes 52 generated by the receive-antenna section 12.

Still referring to FIGS. 9-11, alternate embodiments of the receive-antenna section 70 are contemplated. For example, the number, pattern, and configuration of the antenna segments 22 can be different than as shown in, and as described above in conjunction with, FIGS. 9-11. For example, the receive-antenna section 70 can have more or fewer than twelve antenna segments 22, the antenna segments can be arranged differently than shown in FIG. 9, and each antenna element 22 can have various configurations of sub-elements 30 in terms of the number, location, shapes, and designs of the sub-elements.

FIG. 12 is a plot of the radar system 14 effective (two-way) AZ beam pattern 90 resulting from the combination of the patterns (FIGS. 10-11) of the receive-antenna sub-elements 30 (FIG. 2), the receive-antenna array 20 (FIG. 9), and the transmit-antenna section 10 (FIG. 1), according to one embodiment. To generate the effective pattern 90, the receive-array and receive-sub-element beam patterns of the AZ pattern 72 of FIG. 10 (in units of power or magnitude) are multiplied together and by the transmit beam pattern of the AZ pattern 72 (in the same units of power or magnitude) at each beam angle. The effective AZ pattern 90 has significantly lower side-lobe levels, and thus has significantly superior alias rejection, as compared to the AZ receive-array beam pattern, the AZ receive-sub-element beam pattern, or the AZ transmit beam pattern of FIG. 10.

FIG. 13 is a plot of the radar system 14 effective (two-way) EL beam pattern 92 resulting from the combination of the patterns (FIGS. 10-11) of the receive-antenna sub-elements 30 (FIG. 2), receive array 20 (FIG. 9), and the transmit-antenna section 10 (FIG. 1), according to an embodiment. To generate the effective pattern 92, the receive-array and receive-sub-element beam patterns of the EL pattern 74 of FIG. 11 (in units of power or magnitude) are multiplied together and by the transmit beam pattern of the EL pattern 74 (in the same units of power or magnitude) at each beam angle. The effective pattern 92 has significantly lower side-lobe levels, and thus has significantly superior alias rejection, as compared to either the EL receive-array beam pattern, the EL receive-sub-element beam pattern, or the EL transmit-beam pattern of FIG. 11.

Referring to FIGS. 14-19, a technique is described to further reduce aliasing as compared to the above-described embodiments of the radar system 14, according to an embodiment. More specifically, a designer of the radar system 14 can alter the design of an ESA transmit antenna to align nulls of the transmit beam-and-side-lobe pattern (in the AZ or EL dimension) with the peaks of the side lobes of the receive beam-and-side-lobe pattern (in the AZ or EL dimension), or to align the side-lobe peaks of the transmit beam-and-side-lobe pattern with the nulls of the receive beam-and-side-lobe pattern. Such alignment effectively causes the transmit nulls/peaks to "cancel" the receive peaks/nulls in the effective beam-and-side-lobe pattern.

Figure 14:
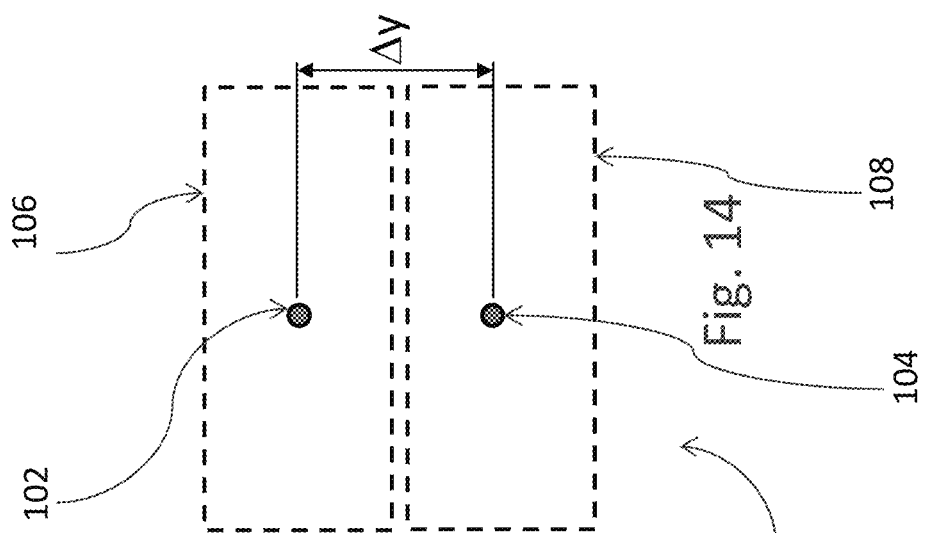
FIG. 14 is a diagram of a transmit-antenna section having multiple (here two) sub-sections, according to an embodiment.

FIG. 14 is a diagram of a transmit-antenna section 100, which is similar to the transmit-antenna section 10 of FIG. 1 except that the transmit-antenna section 100 has two MESA halves (sub-sections) 106 and 108 separated by a vertical distance $\Delta y$ between the geometric centers 102 and 104 of the respective MESAs, according to an embodiment. The transmit-antenna section 100 can form a portion of, or an entire, transmit antenna, and $\Delta y$ can be adjusted to shift the nulls and peaks of the transmit EL beam-and-side-lobe pattern in the EL dimension. This shift is typically symmetrical about the transmit beam. For example, increasing $\Delta y$ causes the nulls and side lobes of the transmit EL beam-and-side-lobe pattern to move closer towards the transmit beam, and decreasing $\Delta y$ causes the nulls and side lobes of the transmit EL beam-and-side-lobe pattern to move farther away from the transmit beam.

Figure 15:
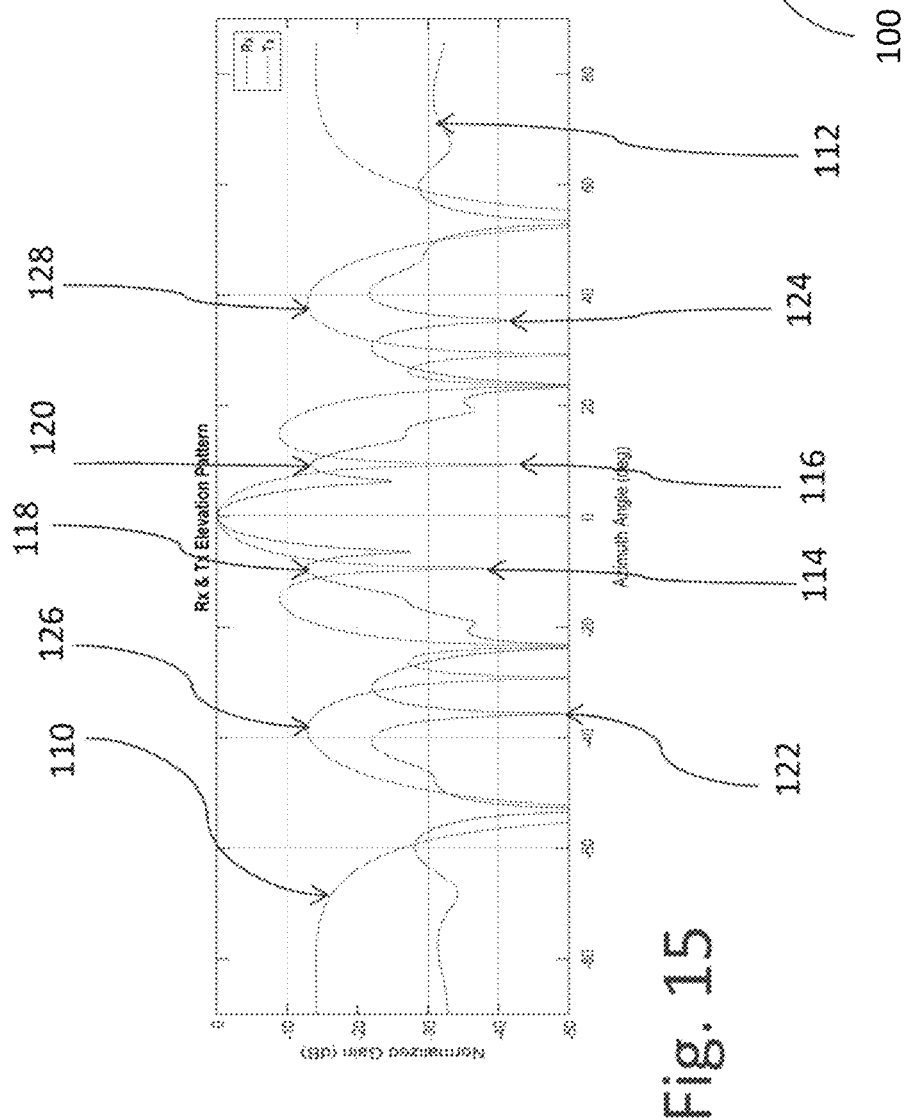
FIG. 15 is a plot of a transmit beam-and-side-lobe pattern in the EL dimension of an embodiment the transmit-antenna section of FIG. 14 overlaying a receive beam-and-side-lobe pattern in the EL dimension of a receive-antenna section that can be similar to the receive-antenna section of FIG. 9, according to an embodiment.

FIG. 15 is a plot of the transmit EL beam-and-side-lobe pattern 110 of an embodiment the transmit-antenna section 100 (FIG. 14) overlaying the receive EL beam-and-side-lobe pattern 112 of a receive-antenna section that can be similar to the receive-antenna section 70 of FIG. 9, according to an embodiment. For example, nulls 114 and 116 of the transmit EL pattern 110 are approximately aligned with peaks of side lobes 118 and 120 of the receive EL pattern 112, and nulls 122 and 124 of the receive EL pattern 112 are approximately aligned with the peaks of side lobes 126 and 128 of the transmit EL pattern 110.

Figures 16, 17, 18, 19:
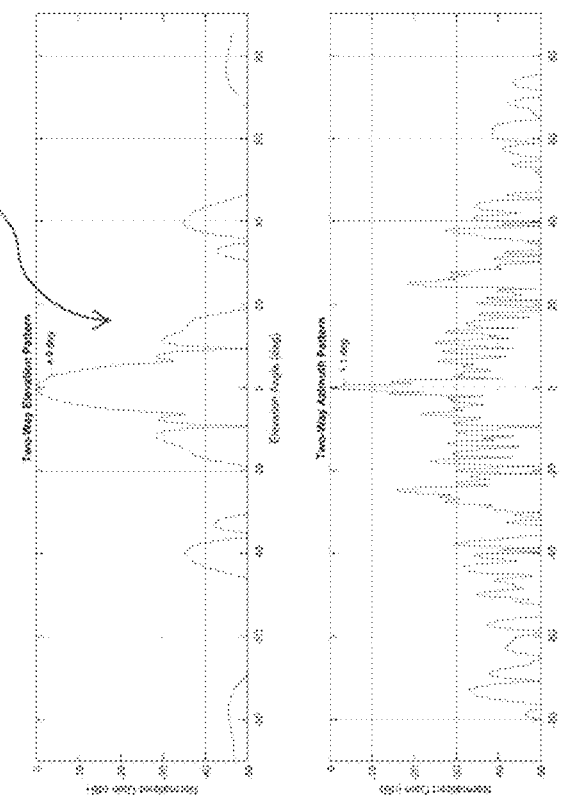
FIG. 16 is the plot of FIG. 15, according to an embodiment in which EL=AZ=0°.
FIG. 17 is a plot of the effective (two-way) beam pattern in the EL dimension resulting from the combination of the transmit and receive beam patterns of FIG. 15, according to an embodiment in which EL=AZ=0°.
FIG. 18 is a plot of a transmit beam-and-side-lobe pattern in the AZ dimension of the embodiment of the transmit-antenna section of FIG. 14 that yields the transmit EL pattern of FIG. 16, overlaying a receive beam-and-side-lobe pattern in the AZ dimension of an embodiment of the receive-antenna section that yields the receive EL pattern of FIG. 16, according to an embodiment in which EL=AZ=0°.
FIG. 19 is a plot of the effective (two-way) beam pattern in the AZ dimension resulting from the combination of the transmit and receive beam patterns of FIG. 18, according to an embodiment in which EL=AZ=0°.

FIG. 16 is the plot of FIG. 15 for EL=AZ=0°.

FIG. 17 is a plot of the effective EL beam pattern 130 resulting from the combination of the transmit and the receive beam patterns 110 and 112 of FIG. 15 for EL=AZ=0°, according to an embodiment.

FIG. 18 is a plot of a transmit AZ beam-and-side-lobe pattern 132 of the embodiment of the transmit-antenna section 100 (FIG. 14) that yields the transmit EL pattern 110 of FIG. 16, overlaying a receive AZ beam-and-side-lobe pattern 134 of the receive-antenna section that yields the receive EL pattern 112 of FIG. 16, for EL=AZ=0°, according to an embodiment.

FIG. 19 is a plot of the effective AZ beam pattern 136 resulting from the combination of the transmit and receive beam patterns 132 and 134 of FIG. 18 for EL=AZ=0°, according to an embodiment.

Continuing with the discussion of FIGS. 14-19, but referring now to FIGS. 20-23, the side-lobe and spatial-aliasing reduction achieved using the above technique is maintained as both transmit and receive arrays are steered in the EL dimension.

Figure 20:
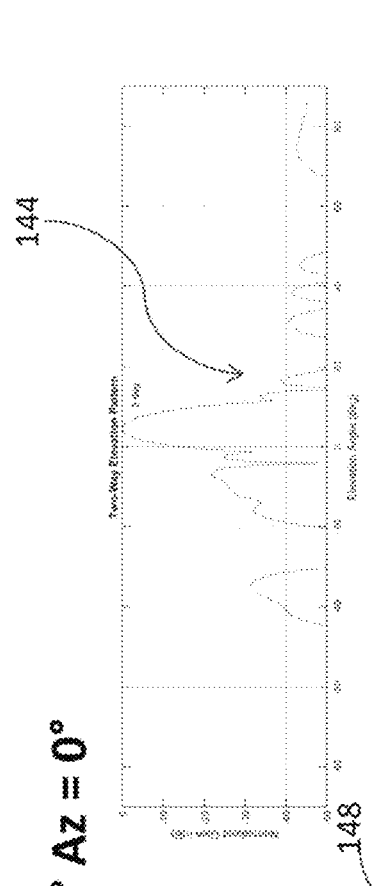
FIG. 20 is a plot of a transmit beam-and-side-lobe pattern in the EL dimension of the embodiment the transmit-antenna section of FIG. 14 that yields the transmit patterns of FIGS. 15-19, overlaying a receive beam-and-side-lobe pattern in the EL dimension of the embodiment of the receive-antenna section that yields the receive patterns of FIGS. 15-19, according to an embodiment in which EL=5° and AZ=0°.

FIG. 20 is a plot of a transmit EL beam-and-side-lobe pattern 140 of the embodiment the transmit-antenna section 100 that yields the transmit patterns of FIGS. 15-19 overlaying a receive EL beam-and-side-lobe pattern 142 of the receive-antenna section that yields the receive patterns of FIGS. 15-19, according to an embodiment in which EL=5° and AZ=0°.

Figure 21:
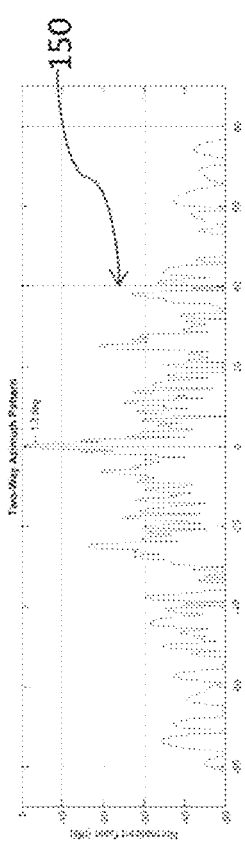
FIG. 21 is a plot of the effective (two-way) beam pattern in the EL dimension resulting from the combination of the transmit and receive beam patterns of FIG. 20, according to an embodiment in which EL=5° and AZ=0°.

FIG. 21 is a plot of the effective EL beam pattern 144 resulting from the combination of the transmit and receive beam patterns 140 and 142 of FIG. 20, according to an embodiment in which EL=5° and AZ=0°.

Figure 22:
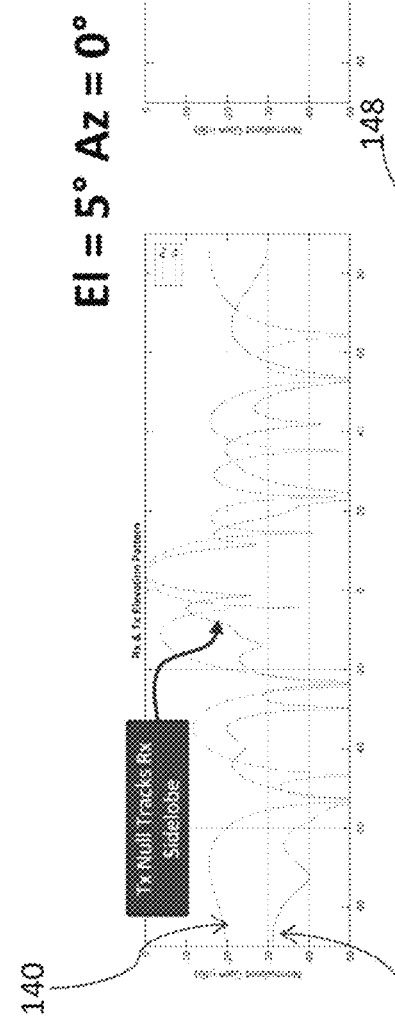
FIG. 22 is a plot of a transmit beam-and-side-lobe pattern in the AZ dimension of the embodiment of the transmit-antenna section of FIG. 14 that yields the transmit pattern of FIG. 20 in the EL dimension, overlaying a receive beam-and-side-lobe pattern in the AZ dimension of the embodiment of the receive-antenna section that yields the receive pattern of FIG. 20 in the EL dimension, according to an embodiment in which EL=5° and AZ=0°.

FIG. 22 is a plot of a transmit AZ beam-and-side-lobe pattern 146 of the embodiment of the transmit-antenna section 100 that yields the transmit EL pattern 140 of FIG. 20, overlaying a receive AZ beam-and-side-lobe pattern 148 of the receive-antenna section that yields the receive EL pattern 142 of FIG. 20, according to an embodiment in which EL=5° and AZ=0°.

Figure 23:
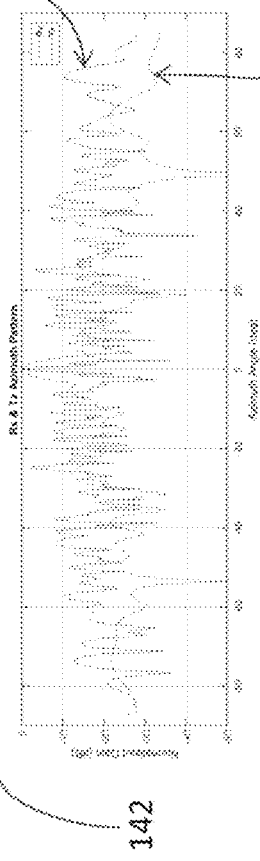
FIG. 23 is a plot of an effective (two-way) beam pattern in the AZ dimension resulting from the combination of the transmit and receive beam patterns of FIG. 22, according to an embodiment in which EL=5° and AZ=0°.

FIG. 23 is a plot of an effective AZ beam pattern 150 resulting from the combination of the transmit and receive beam patterns 146 and 148 of FIG. 22, according to an embodiment in which EL=5° and AZ=0°.

Furthermore, sometimes a peak of a side lobe of a receive beam-and-side-lobe pattern coincides with a peak of a side lobe of a transmit beam-and-side-lobe pattern. That is, instead of acting to reduce the magnitude of the effective side lobe, a receive side lobe and a transmit side lobe are additive such that they act to increase the magnitude of the effective side lobe resulting from the combination of the aligned/coinciding transmit and receive side lobes.

FIG. 24 is a plot of a transmit EL beam-and-side-lobe pattern 152 of an embodiment of the transmit-antenna section 100 (FIG. 14) that yields the transmit patterns of FIGS. 15-19 overlaying a receive EL beam-and-side-lobe pattern 154 of an embodiment of the receive-antenna section 70 (FIG. 9) that yields the receive patterns of FIGS. 15-19, according to an embodiment in which EL=0° and AZ=49°.

FIG. 25 is a plot of an effective (two-way) EL beam pattern 156 resulting from the combination of the transmit and receive beam patterns 152 and 154 FIG. 24, according to an embodiment in which EL=0° and AZ=49°.

FIG. 26 is a plot of a transmit AZ beam-and-side-lobe pattern 160 of an embodiment of the transmit-antenna section 100 (FIG. 14) that yields the transmit patterns of FIGS. 15-19 overlaying a receive AZ beam-and-side-lobe pattern 162 of an embodiment of the receive-antenna section 70 (FIG. 9) that yields the receive patterns of FIGS. 15-19, according to an embodiment in which EL=0° and AZ=49°.

FIG. 27 is a plot of an effective (two-way) AZ and EL beam pattern 164 resulting from the combination of the transmit and receive beam patterns 160 and 162 of FIG. 26, according to an embodiment in which EL=0° and AZ=49°.

Referring to FIGS. 26-27, unfortunately, at an AZ angle of approximately 20°, the peak of a transmit side lobe 166 coincides with a peak of a receive side lobe 168 such that the combination of the side lobes 166 and 168 forms a significant effective side lobe 170.

FIG. 28 is a diagram of a transmit-antenna section 180, according to an embodiment in which the section 180 can form a portion of, or an entire, transmit antenna. The transmit-antenna section 180 includes two vertically stacked but separated transmit sub-sections or portions 182 and 184, each of which can be a respective MESA.

A technique for misaligning, or decorrelating, the peaks of the transmit side lobes and receive side lobes 166 and 168 of FIG. 26 is to shift, or slide, the transmit portion 182 of the transmit-antenna section 180 in the horizontal (AZ) dimension relative to the transmit portion 184.

FIG. 29, which is similar to FIG. 24, is a plot of a transmit EL beam-and-side-lobe pattern 186 of an embodiment of the transmit-antenna section 100 (FIG. 14) that yields the transmit patterns of FIGS. 15-19 overlaying a receive EL beam-and-side-lobe pattern 187 of an embodiment of the receive-antenna section 70 (FIG. 9) that yields the receive patterns of FIGS. 15-19, according to an embodiment in which EL=0° and AZ=49°.

FIG. 30, which is similar to FIG. 25, is a plot of an effective (two-way) EL beam pattern 188 resulting from the combination of the transmit and receive beam patterns 186 and 187 FIG. 29, according to an embodiment in which EL=0° and AZ=49°.

FIG. 31 is a plot of a transmit AZ beam-and-side-lobe pattern 190 of an embodiment of the transmit-antenna section 180 (FIG. 28) that yields the transmit patterns of FIGS. 15-19 overlaying a receive AZ beam-and-side-lobe pattern 192 of the receive-antenna section 70 (FIG. 9) that yields the receive patterns of FIGS. 15-19, according to an embodiment in which EL=0° and AZ=49°.

FIG. 32 is a plot of an effective AZ beam pattern 194 resulting from the combination of the transmit and receive beam patterns 190 and 192 of FIG. 31, according to an embodiment in which EL=0° and AZ=49°.

Referring to FIGS. 28 and 31-32, at the AZ angle of approximately 20°, the AZ shift of the transmit portion 182 of the transmit antenna section 180 relative to the transmit portion 184 shifts the peak of the transmit side lobe 166 to the left in FIG. 31 such that the peak no longer coincides with the peak of the receive side lobe 168. Furthermore, this shift also reduces the magnitude of the peak of the transmit side lobe 166. Therefore, the magnitude of the effective side lobe 170 formed by the combination of the side lobes 166 and 168 is significantly reduced (by approximately 15 dB) from the magnitude of the side lobe 170 in FIG. 27.

Referring again to FIG. 27, as well as to FIG. 14, the technique of shifting, in AZ (and/or shifting in EL), the transmit portion 182 (106) relative to transmit portion 184 (108) can be applied to decorrelate transmit and receive side lobes at other beam angles in the AZ dimension. A designer can select the magnitude and polarity/direction of the shift that yields the best overall side-lobe uncorrelation over all beam angles in the AZ dimension for a particular application.

Another technique for reducing aliasing due to the receive antenna receiving redirected transmitted energy along one or more receive side lobes is to take advantage of the plurality of complex weights which can be applied to each of the receive channels, noting the fact that multiple choices for the complex weight vector may result in receive arrays with nearly identical main-beams, but with very different side-lobe patterns.

This technique can be applied to selectively reduce one or more of the receive side lobes by adjusting the complex weighting of each of one or more of the receive antenna segments 22 (FIG. 4) for each of one or more positions of the receive beam (or bundle of receive beams). A designer can determine, by simulation or measurement, the major receive side lobes at a receive-beam position, and can determine the best complex weighting for each antenna segment 22 to impart to the receive beam (or bundle of receive beams) the desired beam characteristics (e.g., HPBWs in the AZ and EL dimensions) and to impart to the major receive side lobes the desired side-lobe characteristics (e.g., magnitude, phase). Then, the designer can program the radar system 14 to implement these respective determined complex weightings for the antenna segments 22 while the receive beam has the corresponding receive-beam position. The designer can repeat this procedure for one or more positions of the receive beam, and can store, e.g., in a look-up table (LUT), the respective complex weightings for each antenna segment 22 for each receive-beam position.

Figure 33:
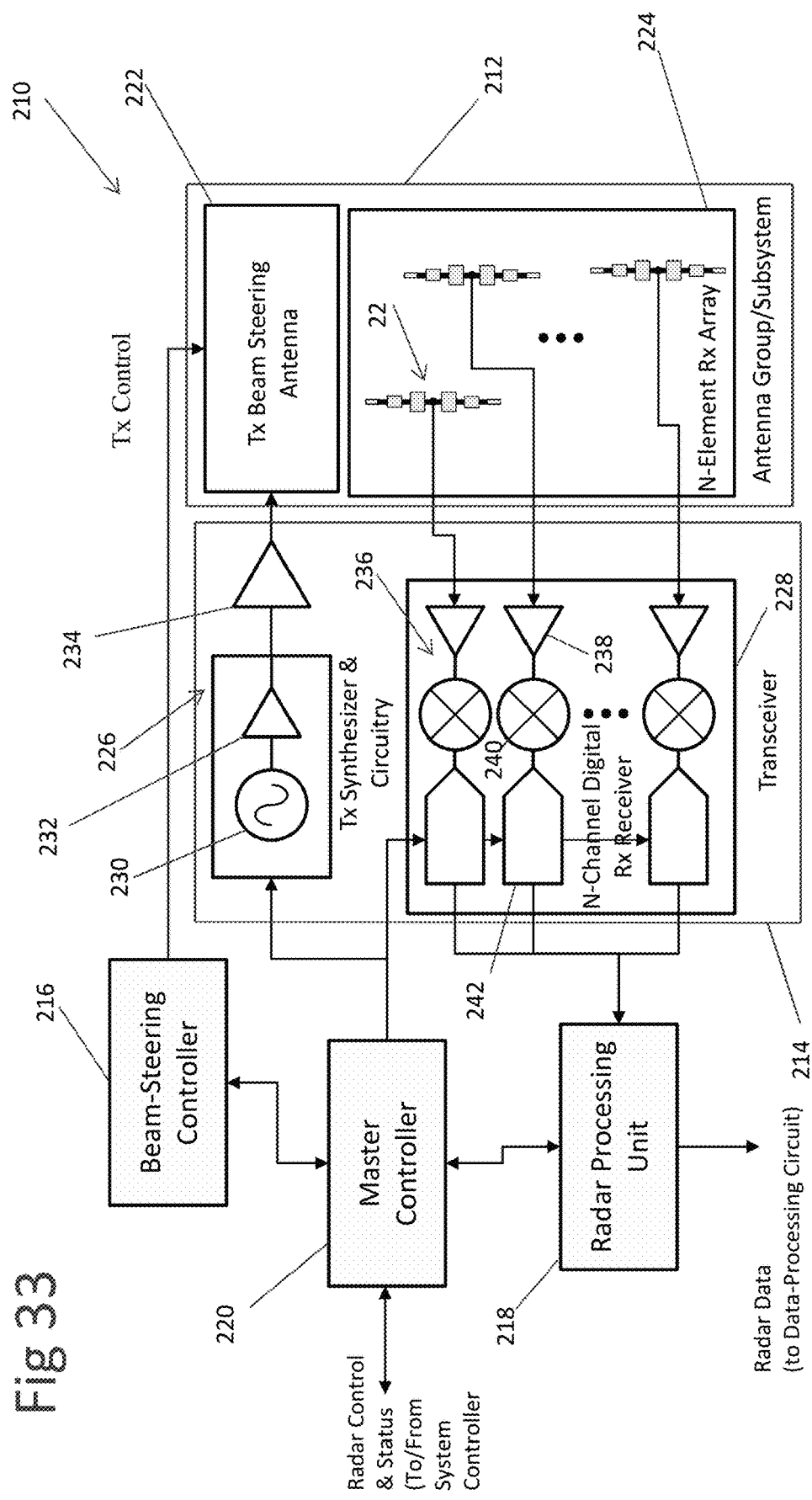
FIG. 33 is a diagram of a radar subsystem that incorporates one or more of the transmit-antenna sections described above in conjunction with FIGS. 1, 14, and 28 and one or more of the receive-antenna sections described above in conjunction with FIGS. 1-2, 4, and 9, according to an embodiment.

FIG. 33 is a block diagram of a radar subsystem 210, which includes an antenna group or subsystem 212 including one or more of the transmit and receive antennas 10, 12, 100, and 180 of FIGS. 1-2, 4, 9, 14, and 28, according to an embodiment in which the radar subsystem 210 can be the same as, or can be substituted for, the radar system 14 of FIG. 1.

In addition to the antenna group 212, the radar subsystem 210 includes a transceiver 214, a beam-steering controller 216, a radar processing unit 218, and a master controller 220, which components can be circuits that are hardwired, that are data-stream configurable, that execute software, or that are subcombination or combination of such circuits.

The antenna subsystem 212 includes a transmit antenna 222, which can include one or more of the transmit-antenna sections 10 (FIG. 1), 100 (FIG. 14), and 180 (FIG. 28), and includes a receive antenna 224, which can include one or more of the receive-antenna sections 12 (FIGS. 1-2 and 4) or 70 (FIG. 9). As described above, the transmit antenna 222 is configured to generate one or more transmit-beam patterns have one or more desired characteristics, and the receive antenna 224 is configured to generate one or more receive-beam patterns having one or more desired characteristics, such that the transmit-beam patterns combine with the respective receive-beam patterns to form spatial filters.

The transceiver 214 includes transmit circuitry 226 and receive circuitry 228. The transmit circuitry 226 includes a voltage-controlled oscillator (VCO) 230, a preamplifier 232, and an amplifier (PA) 234. The VCO 230 is configured to generate a signal having a frequency $f_0=c/\lambda_0$, which is the frequency for which the transmit antenna 222 is designed. The preamplifier 232 is configured to amplify the VCO signal, and the PA 234 is configured to amplify the signal from the preamplifier. The receiver circuitry 228 includes a respective receive channel 236 for each antenna segment 22 of the receive antenna 224. Each a low-noise amplifier (LNA) 238, a mixer 240, and an analog-to-digital converter (ADC) 242. The LNA 238 is configured to amplify signals received by the receive antenna 224. The mixer 240 is configured to shift the frequencies of the amplified received signals down to a base band, and the ADC 242 is configured to convert the down-shifted analog signals to digital signals for processing by the radar processing unit 220.

The beam-steering controller 216 is configured to steer the transmitting beams generated by the one or more MESA transmit antennas 222 by generating, on the control lines 18 (FIG. 1) the control signals to the antenna units that compose the one or more transmit antennas as a function of time and main-transmit-beam position. By appropriately generating the control signals, the beam-steering controller 216 is configured to selectively activate and deactivate the antenna elements of the one or more MESA transmit antennas 222 according to selected spatial and temporal patterns. Beam steering of a transmit antenna, such as the one or more MESA transmit antennas 222, is described below in conjunction with FIGS. 35-37.

The radar processing unit 218 is configured to receive each of the digitized baseband received signals from the receiver 228, and to process the signals to form, and to steer, a receive beam as described above. As described above, the radar processing unit 218 is configured to generate, at any given time, a respective receive beam pattern by amplifying each of the digitized signals with a respective gain, and by shifting each of the digitized signals by a respective phase. By changing the gains and the phase shifts as a function of time, the radar processing unit 218 effectively steers one or more main receive beams of the receive beam pattern. And the radar processing unit 218 provides the radar data carried by the formed receive beam pattern to a conventional data-processing circuit for further processing for, e.g., detecting an object along a receive beam, and determining the object's location and velocity. For example, data-processing circuit can be configured to analyze the signals from the receiver 228 to, e.g., identify a detected object and the object's location and velocity, and to determine what action, if any, that a system including, or coupled to, the radar subsystem 210 should take. For example, if the system is a self-driving vehicle or a self-directed drone, then the data-processing circuit is configured to determine what action (e.g., braking, swerving), if any, the vehicle should take in response to the detected object. Alternatively, the radar processing unit 218 can be configured to perform such further processing of the radar data instead of, or in addition to, the data-processing system.

The master controller 220 is configured to control the transceiver 214, the beam-steering controller 216, and the radar processing unit 218 in response to radar control signals from a radar-system controller (not shown in FIG. 33. For example, assuming that the one or more transmit antennas 222 are designed to operate at frequencies in a range centered about $f_0$, the master controller 220 is configured to adjust the frequency of the signal generated by the VCO 230 for, e.g., environmental conditions such as weather, the average number of objects in the range of the one or more transmit antennas and one or more receive antennas 224, and the average distance of the objects from the one or more transmit and receive antennas, and to conform the transmit signal to spectrum regulations. Further in example, the master controller 220 can be configured to issue, to the beam-steering controller 216 and to the radar processing unit 218, commands that cause the beam-steering controller and the radar processing unit to form transmit and receive beams, respectively, that correspond to the commands.

Operation of the radar subsystem 220 is described below, according to an embodiment. Any of the system components, such as the master controller 220, can store in a memory, and execute, software/program instructions to perform the below-described actions. Alternatively any of the system components, such as the system controller (not shown in FIG. 33), can store, in a memory, a data set, such as firmware, that when loaded configures one or more of the system components to perform the below-described actions. Or any of the system components, such as the system controller, can be hardwired to perform the below-described actions.

The master controller 220 generates a control voltage that causes the VCO 230 to generate a signal at a frequency within a frequency range centered about $f_o$. For example, $f_o$ can be in the range of approximately 5 Gigahertz (GHz)-100 GHz.

The VCO 230 generates the signal, and the PA 232 and amplifier 234 amplify the signal and provide the amplified signal to the one or more transmit antennas 222.

While the amplifier 234 is coupling the transmit signal to the one or more transmit antennas 222, the beam-steering controller 216, in response to the master controller 220, is generating control signals to the antenna units of the one or more transmit antennas. These control signals cause the one or more transmit antennas to generate and to steer one or more main signal-transmission beams. As described above in conjunction with FIGS. 7-8, 10-27, and 29-32, the control signals cause the one or more main signal-transmission beams to have desired characteristics, and also cause the transmission side lobes to have desired characteristics such as suitable total side-lobe power and a suitable side-lobe level (e.g., between the smallest main signal-transmission beam and the largest side lobe).

Then, the master controller 220 causes the VCO 230 to cease generating the transmit signal.

Next, while the VCO 230 is generating no signal, the LNAs 238 respectively amplify the signals received from the respective receive-antenna segments 22.

Then, the mixers 240 respectively down-convert the amplified signals received from the LNAs 238 from a frequency, e.g., at or near $f_o$, to a baseband frequency.

Next, the ADCs 242 convert the analog down-converted signals to respective digital signals.

Then, the master controller 220 generates and sends one or more control signals to the radar processing unit 218.

These control signals cause the radar processing unit 218 to generate and to steer one or more main signal-receive beams by applying, to each of the digitized signals from the receiver circuit 214, a suitable respective gain and phase shift. As described above in conjunction with FIGS. 7-8, 10-27, and 29-32, the control signals cause the radar processing unit 218 to generate the one or more main signal-receive beams to have desired characteristics, and also to generate the side lobes to have desired characteristics such as suitable total side-lobe power and a suitable side-lobe level.

Next, radar processing unit 218, or the data-processing circuit (not shown in FIG. 33), analyzes the amplified and phase-shifted digital signals to obtain information from the signals and to determine what, if anything, should be done in response to the information obtained from the signals.

The radar subsystem 210 can repeat the above cycle one or more times.

Still referring to FIG. 33, alternate embodiments of the radar subsystem 210 are contemplated. For example, the radar subsystem 210 can include one or more additional components not described above, and can omit one or more of the above-described components. Furthermore, functions or operations attributed to one component of the radar subsystem 210 can be performed by another component of the radar subsystem or by another component outside of the radar subsystem.

Figure 34:
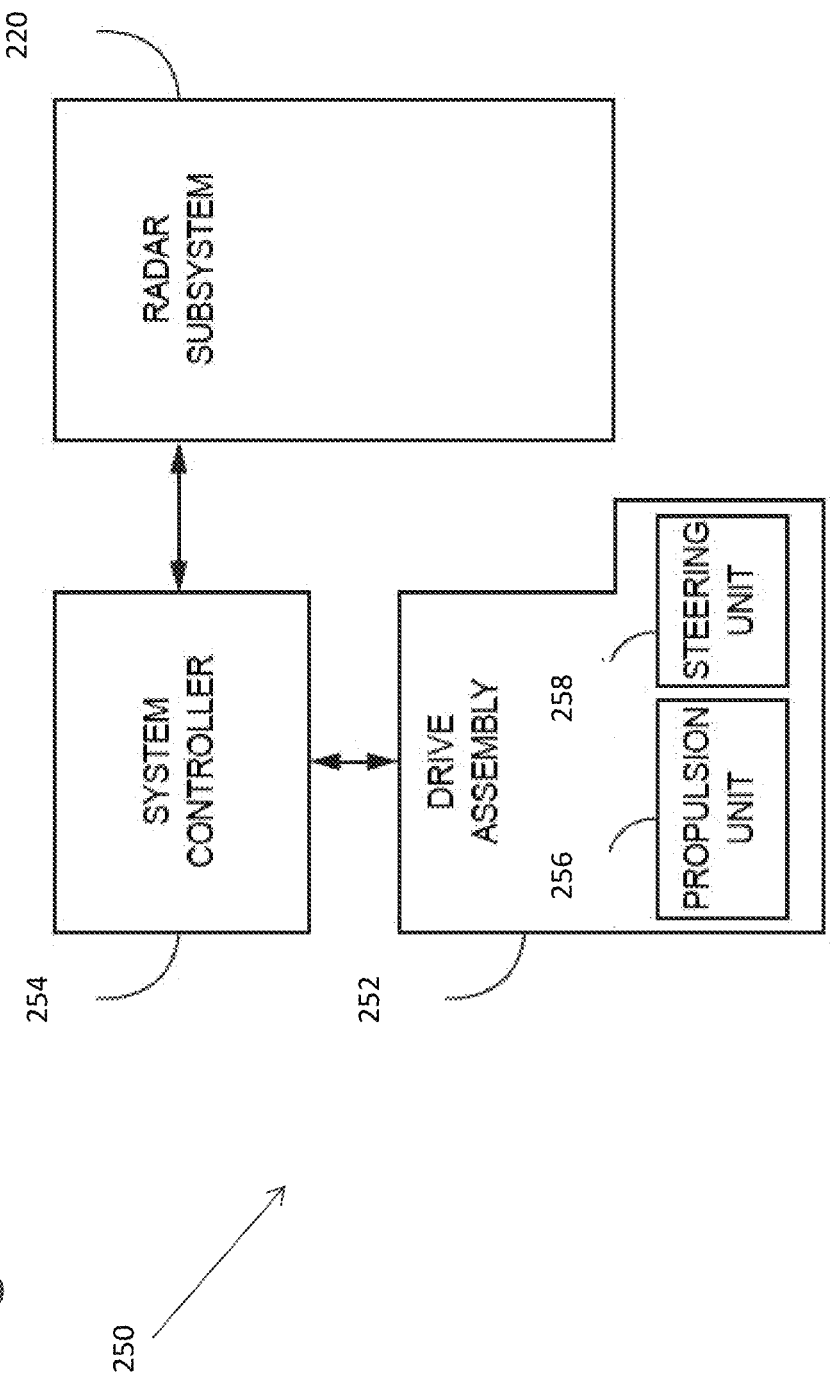
FIG. 34 is a diagram of a system that incorporates one or more of the radar subsystems of FIG. 33, according to an embodiment.

FIG. 34 is a block diagram of a system, such as a vehicle system 250, which includes the radar subsystem 210 of FIG. 33, according to an embodiment. For example, the vehicle system 250 can be an unmanned aerial vehicle (UAV) such as a drone, or a self-driving car.

In addition to the radar subsystem 210, the vehicle system 250 includes a drive assembly 242 and a system controller 244.

The drive assembly 252 includes a propulsion unit 256, such as an engine or motor, and a steering unit 258, such as a rudder, flaperon, pitch control, or yaw control (for, e.g., an UAV or drone), or a steering wheel linked to steerable wheels (for, e.g., a self-driving car).

The system controller 254 is configured to control, and to receive information from, the radar subsystem 210 and the drive assembly 252. For example, the system controller 254 can be configured to receive locations, sizes, and speeds of nearby objects from the radar subsystem 210, and to receive the speed and traveling direction of the vehicle system 210 from, e.g., a GPS receiver (not shown in FIG. 34) or from a sensor (e.g., accelerometer, also not shown in FIG. 34) on board the system 250.

Operation of the vehicle system 250 is described below, according to an embodiment. Any of the system components, such as the system controller 254, can store in a memory, and execute, software/program instructions to perform the below-described actions. Alternatively any of the system components, such as the system controller 254, can store, in a memory, firmware that when loaded configures one or more of the system components to perform the below-described actions. Or any of the system components, such as the system controller 244, can be circuitry hardwired to perform the below-described actions.

The system controller 254 activates the radar subsystem 210, which, as described above in conjunction with FIG. 33, provides to the system controller information regarding one or more objects in the vicinity of the vehicle system 250. For example, if the vehicle system 250 is an UAV or a drone, then the radar subsystem can provide information regarding one or more objects (e.g., birds, aircraft, and other UAVs/drones), in the flight path to the front, sides, and rear of the UAV/drone. Alternatively, if the vehicle system 250 is a self-driving car, then the radar subsystem 210 can provide information regarding one or more objects (e.g., other vehicles, debris, pedestrians, bicyclists) in the roadway to the front, sides, and rear of the vehicle system.

In response to the object information from the radar subsystem 210, the system controller 254 determines what action, if any, the vehicle system 250 should take in response to the object information. Alternatively, the master controller 220 (FIG. 33) of the radar subsystem 210 can make this determination and provide it to the system controller 254.

Next, if the system controller 254 (or master controller 220 of FIG. 33) determined that an action should be taken, then the system controller causes the drive assembly 252 to take the determined action. For example, if the system controller 254 or master controller 220 determined that a UAV system 250 is closing on an object in front of the UAV system, then the system controller 254 can control the propulsion unit 256 to reduce air speed. Or, if the system controller 254 or master controller 220 determined that an object in front of a self-driving system 250 is slowing down, then the system controller 254 can control the propulsion unit 256 to reduce engine speed and to apply a brake. Or if the system controller 254 or master controller 220 determined that evasive action is needed to avoid an object (e.g., another UAV/drone, a bird, a child who ran in front of the vehicle system 250) in front of the vehicle system, then the system controller 254 can control the propulsion unit 256 to reduce engine speed and, for a self-driving vehicle, to apply a brake, and can control the steering unit 258 to maneuver the vehicle system away from or around the object.

Still referring to FIG. 34, alternate embodiments of the vehicle system 250 are contemplated. For example, the vehicle system 250 can include one or more additional components not described above, and can omit one or more of the above-described components. Furthermore, the vehicle system 250 can be a vehicle system other than a UAV, drone, or self-driving car. Other examples of the vehicle system 250 include a watercraft, a motor cycle, a car that is not self-driving, and a space craft. Moreover, a system including the radar subsystem 210 can be other than a vehicle system.

Figure 35:
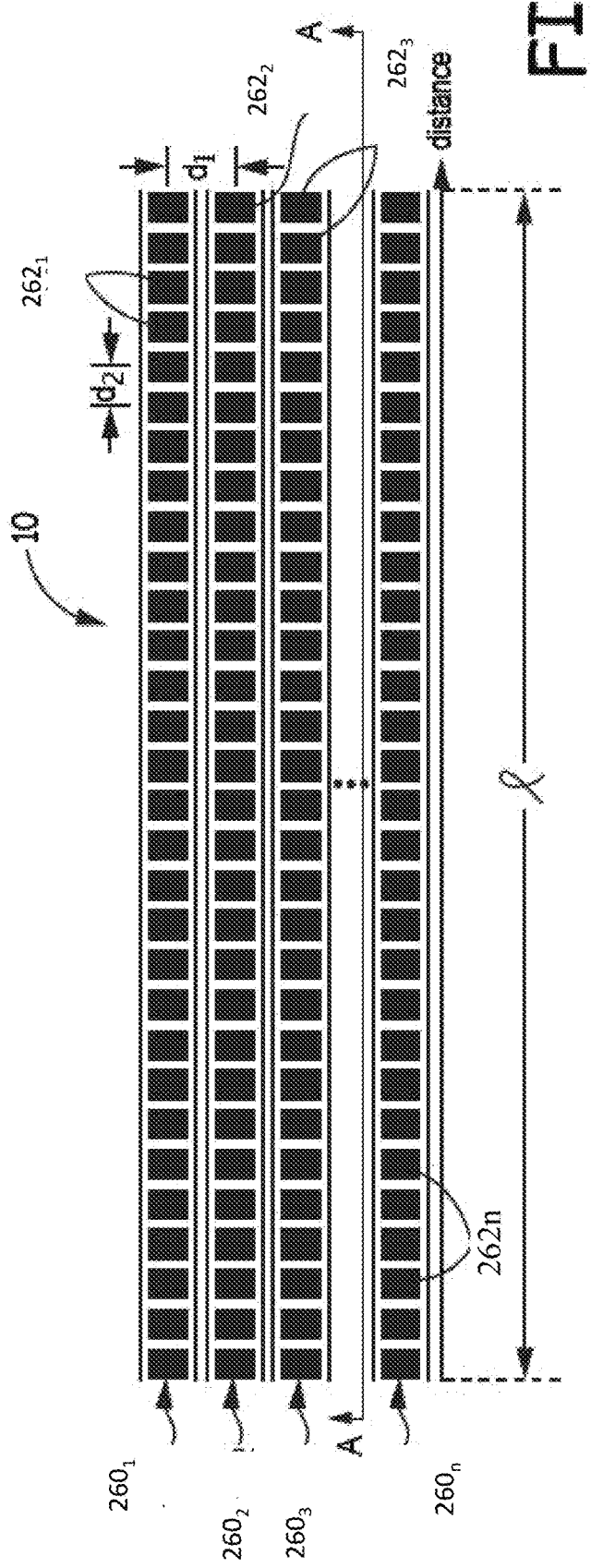
FIG. 35 is a plan view of the transmit-antenna section of FIG. 1, and of a subsection of the transmit-antenna sections of FIG. 14 and FIG. 28, according to an embodiment.

FIG. 35 is a plan view of the transmit-antenna section 10 of FIG. 1 in which the transmit-antenna section is a holographic-aperture antenna section having multiple waveguides $260_1$-$260_n$ and corresponding conductive antenna elements $262_1$-$262_n$, according to an embodiment. The waveguides 260 are conventional rectangular-strip transmission-line waveguides, only the top portions of which are visible in FIG. 35, and are approximately parallel to one another. The antenna elements $262_1$-$262_n$ are arranged over the waveguides 260 in respective one-dimensional arrays. For example, the antenna elements $262_1$ are arranged in a one-dimensional array over the waveguide $260_1$, the antenna elements $262_2$ are arranged in a one-dimensional array over the waveguide $260_2$, and so on. Assuming that the transmit-antenna section 10 is designed to transmit and receive signals at a wavelength of $\lambda_0$, the waveguides 260 are spaced apart from one another, on longitudinal center, by a distance $d_1 \approx \lambda_0/2$, and the antenna elements 262 within each one-dimensional array are spaced apart from one another by a distance $d_2 \ll \lambda_0$. For example, $\lambda_0/1000 < d_2 < \lambda_0/10$. Furthermore, each of the waveguides 260 has approximately the same length l of between approximately $3\lambda_0$-$20\lambda_0$, or the length l can be even longer than $20\lambda_0$.

Figure 36:
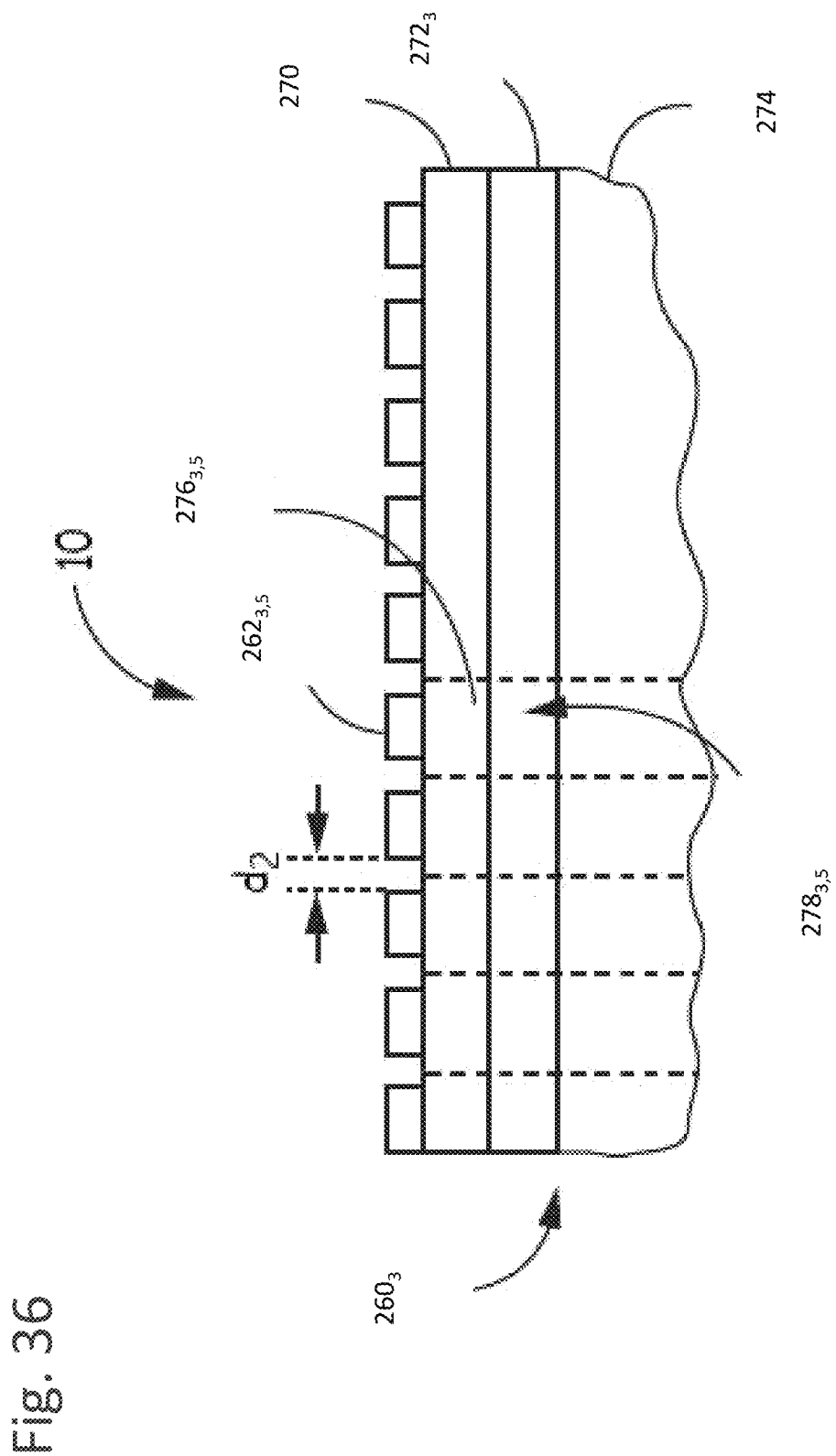
FIG. 36 is a side view of the transmit-antenna section of FIG. 35, according to an embodiment.

FIG. 36 is a cut-away side view of the transmit-antenna section 10 of FIG. 35, taken along line A-A of FIG. 35, according to an embodiment. Although only the waveguide $260_3$ and the corresponding antenna elements $262_3$ are shown in FIG. 36, the following discussion also applies to the other waveguides and antenna elements.

The waveguide $262_3$ includes a coupling layer 270 having an adjustable impedance about a frequency $f_0 = c/\lambda_0$, a conductive layer/strip $272_3$, and a dielectric layer 274, where c is the speed of light in free space. Although not shown, the transmit-antenna section 10 includes a conductive plane, such as a ground plane, disposed beneath the dielectric layer 274. In operation, a signal guided by the waveguide $260_3$ propagates along the dielectric layer 274 between the conductive strip $272_3$ and the ground plane. Although the transmit-antenna section 10 can include a single coupling layer 270 and a single dielectric layer 274 common to all of the waveguides 260, the antenna section includes separate conductive strips 272, one strip per waveguide. It is these strips 272, and the corresponding antenna elements 262, that are spaced apart by the distance $d_1$ (see FIG. 35).

Each antenna element $262_3$, and a coupling region $276_3$ of the layer 270 disposed below the antenna element, form a respective antenna unit $278_3$. For example, the antenna element $262_{3,5}$ and the coupling region $276_{3,5}$ of the layer 270 form an antenna unit $278_{3,5}$ of the transmit antenna-section 10.

Figure 37:
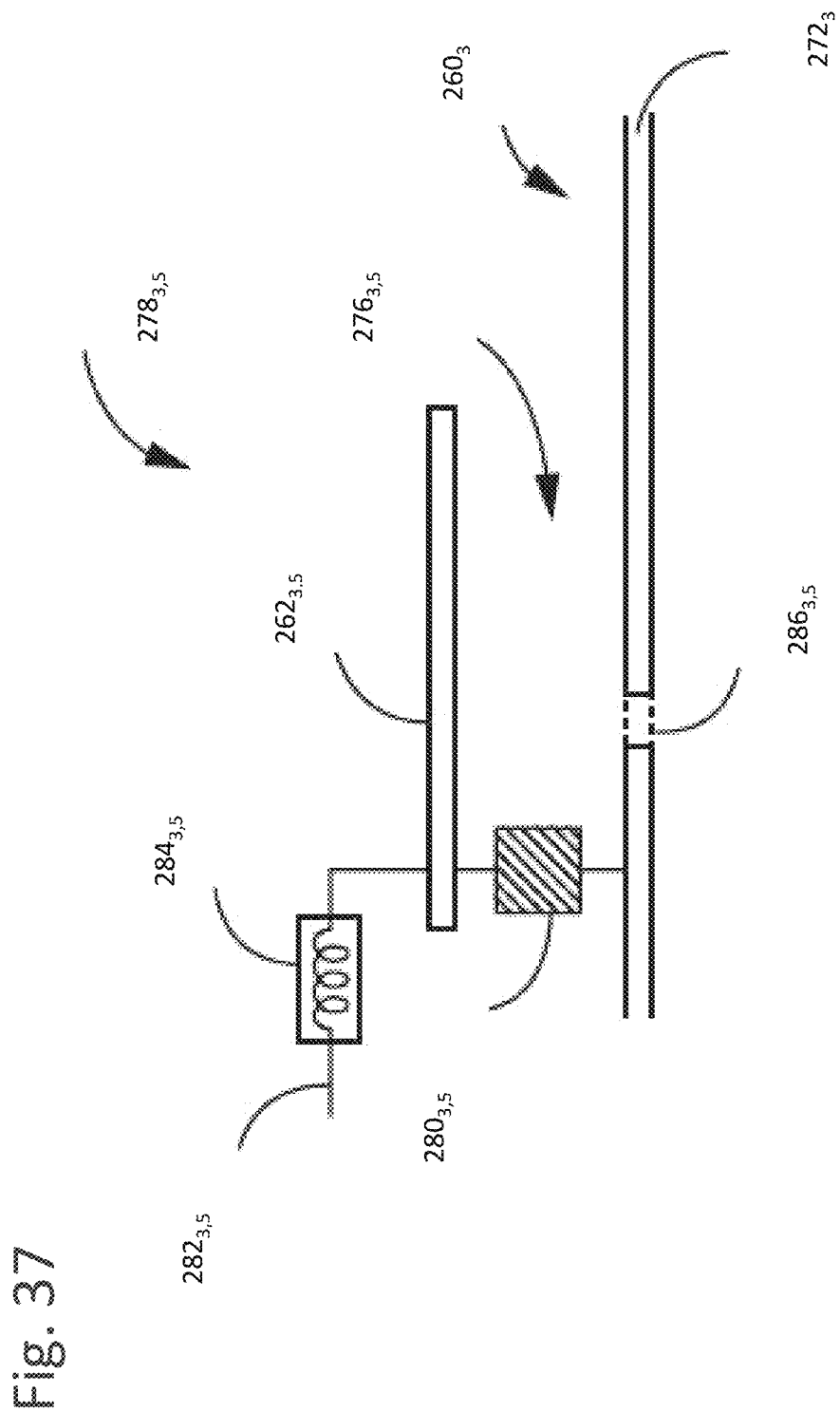
FIG. 37 is a side view and an electrical diagram of the transmit-antenna section of FIGS. 35 and 36, according to an embodiment.

FIG. 37 is a side view and electrical diagram of the antenna unit $278_{3,5}$ of FIG. 36, and the portion of the conductive strip $272_3$ of the waveguide $260_3$ corresponding to the antenna unit, according to an embodiment.

The coupling region $276_{3,5}$ can be modeled as a lumped adjustable-impedance element $280_{3,5}$, which is electrically coupled between the conductive strip $272_3$ and the antenna element $262_{3,5}$. A conductive control line $282_{3,5}$ is directly coupled to the lumped element $280_{3,5}$, or is indirectly coupled to the lumped element via the conductive antenna element $262_{3,5}$ as shown. As described below, a controller (e.g., the master controller 220 of FIG. 33) can selectively couple and uncouple the signal propagating along the waveguide $260_3$ to and from the antenna element $262_{3,5}$, and can thus selectively activate and deactivate the antenna element, by selectively changing the bias signal (e.g., a bias voltage) on the control line $282_{3,5}$. Furthermore, a low-pass filter $284_{3,5}$ can be serially coupled between the lumped element $280_{3,5}$ and the controller to uncouple, from the controller, high-frequency energy from the signal propagating along the waveguide $260_3$.

And the portion of the conductive strip $272_3$ corresponding to the antenna unit $278_{3,5}$ includes a gap $38_{3,5}$, which can be filled with that same material that forms the coupling layer 270, and which is configured to couple the signal propagating along the waveguide $260_3$ to the antenna unit.

Still referring to FIG. 37, during operation of the antenna unit $278_{3,5}$, in response to the control signal on the control line $282_{3,5}$ having a level that inactivates the lumped element $280_{3,5}$, the coupling region $276_{3,5}$ presents a large impedance to the gap $286_{3,5}$, and thus blocks the signal propagating along the waveguide $260_3$ from coupling to, and exciting, the antenna element $262_{3,5}$. Therefore, the antenna element $262_{3,5}$ radiates little or no energy.

In contrast, in response to the control signal on the control line $282_{3,5}$ having a level that activates the lumped element $280_{3,5}$, the coupling region $276_{3,5}$ presents a small impedance to the gap $286_{3,5}$, and thus couples the signal propagating along the waveguide $260_3$ to the antenna element $262_{3,5}$ such that the signal excites the antenna element. Therefore, the excited antenna element $262_{3,5}$ radiates energy at the same frequency or frequencies as the frequency or frequencies of the signal propagating along the waveguide $260_3$. For example, when the lumped element $280_{3,5}$ is active, the coupling region $276_{3,5}$ is configured to form, together with the antenna element $262_{3,5}$, a series-resonant circuit having a resonant frequency of approximately $f_0$. As known, at its resonant frequency, a series-resonant circuit has a low impedance, ideally zero impedance. Because the signal propagating along the waveguide $260_3$ has a frequency of approximately $f_0$, the region $276_{3,5}$, when the lumped element $280_{3,5}$ is active, presents a low impedance to the signal. To implement such a selectively resonant circuit, the lumped element $280_{3,5}$ can be, or can include, a semiconductor device, such as a PN-junction diode, field-effect transistor (FET), or other device that, when activated, alters the impedance of the coupling region $26_{3,5}$ such that the coupling region forms, at $f_0$, a series-resonant circuit with the antenna element $262_{3,5}$, or between the conductive strip $272_3$ and the antenna element.

Still referring to FIG. 37, although only the antenna unit $278_{3,5}$ is described, all of the other antenna units 278 of the transmit-antenna section 10 (FIGS. 1 and 35-36) can have the same structure, and can operate in the same manner, as the antenna unit $278_{3,5}$.

Referring to FIGS. 1 and 35-37, further details of the transmit-antenna section 10 and the antenna units 278 can be found in the following documents, which are incorporated by reference herein: U.S. patent application Ser. No. 14/506,432, titled Surface Scattering Antennas With Lumped Elements, which was filed on 3 Oct. 2014, and U.S. Pat. No. 9,450,310, titled Surface Scattering Elements, which was filed on 14 Oct. 2011. Furthermore, each of the subsections 106 and 108 of the transmit-antenna section 100 of FIG. 14, and each of the subsections 182 and 184 of the transmit-antenna section 180 of FIG. 28, can be similar in structure and operation to the transmit-antenna section 10.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

The invention claimed is:

1. An antenna subsystem, comprising:
a sparse receive antenna including an array of receive elements each configured to receive a respective signal having a wavelength and each spaced apart from each adjacent one of the receive elements by a respective first distance that is more than one half of the wavelength; and
an electronically steerable transmit antenna including an array of transmit elements each configured to radiate a respective signal having the wavelength and each spaced apart from each adjacent one of the transmit elements by a respective second distance that is less than one half of the wavelength.

2. The antenna subsystem of claim 1 wherein the sparse receive antenna includes no fewer than eight, and no more than sixty four, receive elements.

3. The antenna subsystem of claim 1 wherein each first distance is at least five times the wavelength.

4. The antenna subsystem of claim 1 wherein at least one of the first distances is at least ten times the wavelength.

5. The antenna subsystem of claim 1 wherein the electronically steerable transmit antenna includes multiple transmit-antenna sections each including a respective subarray of the transmit elements.

6. The antenna subsystem of claim 1 wherein the electronically steerable transmit antenna includes:
a first transmit-antenna section having a first subarray of the transmit elements; and
a second transmit-antenna section having a second subarray of the transmit elements and offset from the first transmit-antenna section.

7. The antenna subsystem of claim 1 wherein each second distance is no greater than one tenth of the wavelength.

8. The antenna subsystem of claim 1 wherein the electronically steerable transmit antenna includes a metamaterial electronically steerable transmit antenna.

9. The antenna subsystem of claim 1 wherein the array of the electronically steerable transmit antenna is configured as an oversampling array.

10. The antenna subsystem of claim 1 wherein the electronically steerable transmit antenna lacks phase-shift circuits.

11. The antenna subsystem of claim 1 wherein the electronically steerable transmit antenna includes a holographic antenna.

12. A radar subsystem, comprising:
an electronically steerable transmit antenna including an array of transmit elements each configured to radiate a respective signal having a wavelength and each spaced apart from each adjacent one of the transmit elements by a respective first distance that is less than one half of the wavelength;
a beam-steering controller configured to cause the transmit antenna to form, from the radiated signals, a transmit beam pattern including a main transmit beam that occupies a transmit-beam region;
a sparse receive antenna including an array of receive elements each configured to receive a respective signal having a wavelength and each spaced apart from each adjacent one of the receive elements by a respective first distance that is more than one half of the wavelength; and
a radar processing unit configured to form, from the received signals, a receive beam pattern including a main receive beam within the transmit-beam region and including a first receive side lobe having a first amplitude and within a portion of the transmit-beam region having a second amplitude that is less than the first amplitude.

13. The radar subsystem of claim 12 wherein the radar processing unit is configured to form the receive beam pattern while the transmit antenna is forming the transmit beam pattern.

14. The radar subsystem of claim 12 wherein the radar processing unit is configured to form the receive beam pattern after the transmit antenna forms the transmit beam pattern.

15. The radar subsystem of claim 12 wherein:
the beam-steering controller is configured to cause the transmit antenna to form, from the radiated signals, the transmit beam pattern including a transmit-side-lobe peak at a first direction; and
the radar processing unit is configured to form, from the received signals, the receive beam pattern including a second-receive-side-lobe having a null at approximately the first direction.

16. The radar subsystem of claim 12 wherein:
the beam-steering controller is configured to cause the transmit antenna to form, from the radiated signals, the transmit beam pattern including a transmit-side-lobe null at a first direction; and
the radar processing unit is configured to form, from the received signals, the receive beam pattern including a second-receive-side-lobe peak at approximately the first direction.

17. A vehicle, comprising:
a radar subsystem, including
an electronically steerable transmit antenna including an array of transmit elements each configured to radiate a respective signal having a wavelength and each spaced apart from each adjacent one of the transmit elements by a respective first distance that is less than one half of the wavelength,
a beam-steering controller configured to cause the transmit antenna to form, from the radiated signals, a transmit beam pattern including a main transmit beam that occupies a transmit-beam region,
a sparse receive antenna including an array of receive elements each configured to receive a respective signal having a wavelength and each spaced apart from each adjacent one of the receive elements by a respective first distance that is more than one half of the wavelength, and
a radar processing unit configured
to form, from the received signals, a receive beam pattern including a main receive beam within the transmit-beam region and including a first receive side lobe having a first amplitude and within a portion of the transmit-beam region having a second amplitude that is less than the first amplitude, and
to generate data in response to a signal received over the main receive beam;
a drive assembly; and
a controller configured to control the drive assembly in response to the data.

18. The system of claim 17 wherein the drive assembly comprises:
a propulsion unit; and
a steering unit.

19. A method, comprising:
generating a transmit beam pattern using an electronically steerable antenna, the transmit beam including a main transmit beam that occupies a main-transmit-beam region; and
generating a receive beam pattern in response to a signal received by a sparse digital-beamforming antenna, the receive beam pattern including a main receive beam that occupies a main-receive-beam region within the main-transmit-beam region.

20. The method of claim 19 wherein:
the main-transmit-beam region is defined by the half-power beam width of the main transmit beam; and
the main-receive-beam region is defined by the half-power beam width of the main receive beam.

21. The method of claim 19 wherein generating the transmit beam pattern and the receive beam pattern includes generating the transmit beam pattern and the receive beam pattern at different times.

22. The method of claim 19 wherein generating the transmit beam pattern and the receive beam pattern includes generating the transmit beam pattern and the receive beam pattern simultaneously.

23. The method of claim 19 wherein generating the receive beam pattern includes generating the receive beam pattern to include main receive beams that each occupy a respective main-receive-beam region within the main-transmit-beam region.

24. A method, comprising:
generating a transmit beam pattern using an electronically steerable antenna including an array of transmit elements each configured to radiate a respective signal having a wavelength and each spaced apart from each adjacent one of the transmit elements by a respective distance that is less than one half of the wavelength, the transmit beam pattern including a transmit side-lobe region; and
generating a receive beam pattern in response to a signal received by a sparse digital-beamforming antenna, the receive beam pattern including a receive-side-lobe null approximately aligned with the transmit side-lobe region if the transmit side-lobe region is a peak of the receive beam pattern, and including a receive-side-lobe peak approximately aligned with the transmit side-lobe region if the transmit side-lobe region is a null of the receive beam pattern.

25. The method of claim 24 wherein generating the transmit beam pattern includes generating the transmit beam pattern using an electronically steerable antenna having two subsections that are offset from one another.

26. A tangible non-transitory medium storing instructions that, when executed by a computing circuit, cause the computing circuit, or another circuit under control of the computing circuit:
to generate a transmit beam pattern using an electronically steerable antenna, the transmit beam including a main transmit beam that occupies a main-transmit-beam region; and
to generate a receive beam pattern in response to a signal received by a sparse digital-beamforming antenna, the receive beam pattern including main receive beams that each occupy a respective main-receive-beam region within the main-transmit-beam region.

27. A tangible non-transitory medium storing instructions that, when executed by a computing circuit, cause the computing circuit, or another circuit under control of the computing circuit:
to generate a transmit beam pattern using an electronically steerable antenna including an array of transmit elements each configured to radiate a respective signal having a wavelength and each spaced apart from each adjacent one of the transmit elements by a respective distance that is less than one half of the wavelength, the transmit beam including a transmit side-lobe region; and
to generate a receive beam pattern in response to a signal received by a sparse digital-beamforming antenna, the receive beam pattern including a receive-side-lobe null approximately aligned with the transmit side-lobe region if the transmit side-lobe region constitutes a peak of the transmit beam pattern, and including a receive-side-lobe peak approximately aligned the transmit side-lobe region if the transmit side-lobe region constitutes a null of the transmit beam pattern.

28. A radar subsystem, comprising:
an electronically steerable transmit antenna including an array of transmit elements each configured to radiate a respective signal having a wavelength and each spaced apart from each adjacent one of the transmit elements by a respective first distance that is less than one half of the wavelength;
a beam-steering controller configured to cause the transmit antenna to form, from the radiated signals, a transmit beam pattern including a transmit side lobe;
a sparse receive antenna including an array of receive elements each configured to receive a respective signal having a wavelength and each spaced apart from each adjacent one of the receive elements by a respective first distance that is more than one half of the wavelength; and
a radar processing unit configured
to form, from the received signals, a receive beam pattern including a receive-side-lobe null approximately aligned with the transmit side lobe if the transmit side lobe is a peak of the transmit beam pattern, and to form, from the received signals, a receive beam pattern including a receive-side-lobe peak approximately aligned with the transmit side lobe if the transmit side lobe is a null of the transmit beam pattern.

29. The radar subsystem of claim 28 wherein the electronically steerable transmit antenna includes:
a first transmit-antenna section having a first subarray of the transmit elements; and
a second transmit-antenna section having a second subarray of the transmit elements and offset from the first transmit-antenna section.

* * * * *